(12) United States Patent
Fujita et al.

(10) Patent No.: US 12,065,182 B2
(45) Date of Patent: Aug. 20, 2024

(54) TROLLEY AND METHOD FOR SUPPORTING COMPONENT OF SUBSTRATE PROCESSING APPARATUS

(71) Applicant: Tokyo Electron Limited, Tokyo (JP)

(72) Inventors: Yuto Fujita, Yamanashi (JP); Jun Fujihara, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 198 days.

(21) Appl. No.: 17/551,988

(22) Filed: Dec. 15, 2021

(65) Prior Publication Data

US 2022/0194450 A1    Jun. 23, 2022

(30) Foreign Application Priority Data

Dec. 22, 2020    (JP) .................................. 2020-212802

(51) Int. Cl.
*B62B 3/02*    (2006.01)
*B62B 3/10*    (2006.01)

(52) U.S. Cl.
CPC . *B62B 3/02* (2013.01); *B62B 3/10* (2013.01)

(58) Field of Classification Search
CPC .................................... B62B 3/02; B62B 3/10
See application file for complete search history.

(56) References Cited

U.S. PATENT DOCUMENTS 5,772,233 A * 6/1998 Papendick ................ B62B 3/02
                                                                 280/638
11,192,566 B2 * 12/2021 Ceja ........................ B62B 3/008

FOREIGN PATENT DOCUMENTS

| CN | 211055205 U | * | 7/2020 |
| CN | 211055205 U |   | 7/2020 |
| JP | H07-036081 U |   | 7/1995 |
| JP | 2004-170267 A |   | 6/2004 |
| JP | 2019-069737 A |   | 5/2019 |
| JP | 2019069737 A | * | 5/2019 |
| JP | 2020-021967 A |   | 2/2020 |
| KR | 10-2010-0016998 A |   | 2/2010 |

* cited by examiner

*Primary Examiner* — James A Shriver, II
*Assistant Examiner* — Nicholas R. Kandas
(74) *Attorney, Agent, or Firm* — Venjuris, P.C.

(57) ABSTRACT

A trolley includes a trolley body which in turn includes a wheel that is freely movable on a floor, and a first support that supports a component of a substrate processing apparatus that slides in a lateral direction and is pulled out to an outside of the substrate processing apparatus. The trolley also includes a second support that is connected to the trolley body so as to be freely movable between a first position where a width of the trolley in the lateral direction is a first length and a second position where the width in the lateral direction is a second length longer than the first length, and configured to support the component at the second position together with the first support.

15 Claims, 23 Drawing Sheets

TROLLEY AND METHOD FOR SUPPORTING COMPONENT OF SUBSTRATE PROCESSING APPARATUS

CROSS-REFERENCE TO RELATED APPLICATIONS

This application is based on and claims priority from Japanese Patent Application No. 2020-212802 filed on Dec. 22, 2020 with the Japan Patent Office, the disclosure of which is incorporated herein in its entirety by reference.

TECHNICAL FIELD

The present disclosure relates to a trolley and a method for supporting a component of a substrate processing apparatus.

BACKGROUND

An example of a processing apparatus that processes a semiconductor wafer (hereinafter, referred to as a wafer), which is a substrate, may include a wafer inspecting apparatus that performs an inspection on the electrical characteristics of a semiconductor device formed on the wafer. Japanese Patent Laid-Open Publication No. 2020-021967 discloses the wafer inspecting apparatus, and discloses that a member that constitutes a cell of the wafer inspecting apparatus is pulled out from the cell and placed on a trolley for maintenance.

SUMMARY

A trolley according to the present disclosure includes: a trolley body including a wheel that is freely movable on a floor, and including a first support configured to support a component of a substrate processing apparatus that slides in a lateral direction and is pulled out to an outside of the substrate processing apparatus; and a second support connected to the trolley body so as to be freely movable between a first position where a width of the trolley in the lateral direction is a first length and a second position where the width in the lateral direction is a second length longer than the first length, and configured to support the component at the second position together with the first support.

The foregoing summary is illustrative only and is not intended to be in any way limiting. In addition to the illustrative aspects, embodiments, and features described above, further aspects, embodiments, and features will become apparent by reference to the drawings and the following detailed description.

BREIF DESCRIPTION OF THE DRAWINGS

Figure 1:
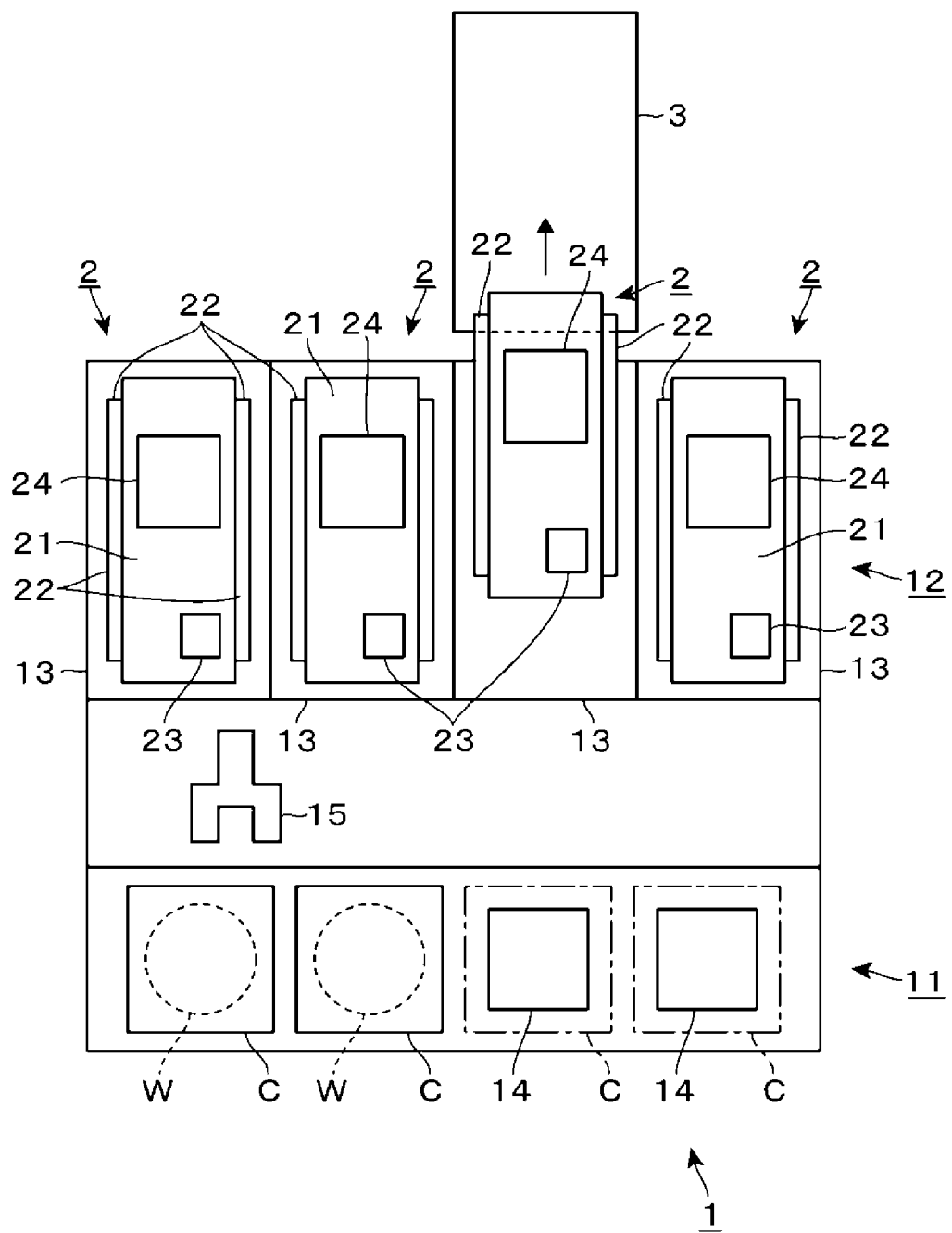

FIG. 1 a plan view of a wafer inspecting apparatus in which a trolley according to a first embodiment is used.

Figure 2:
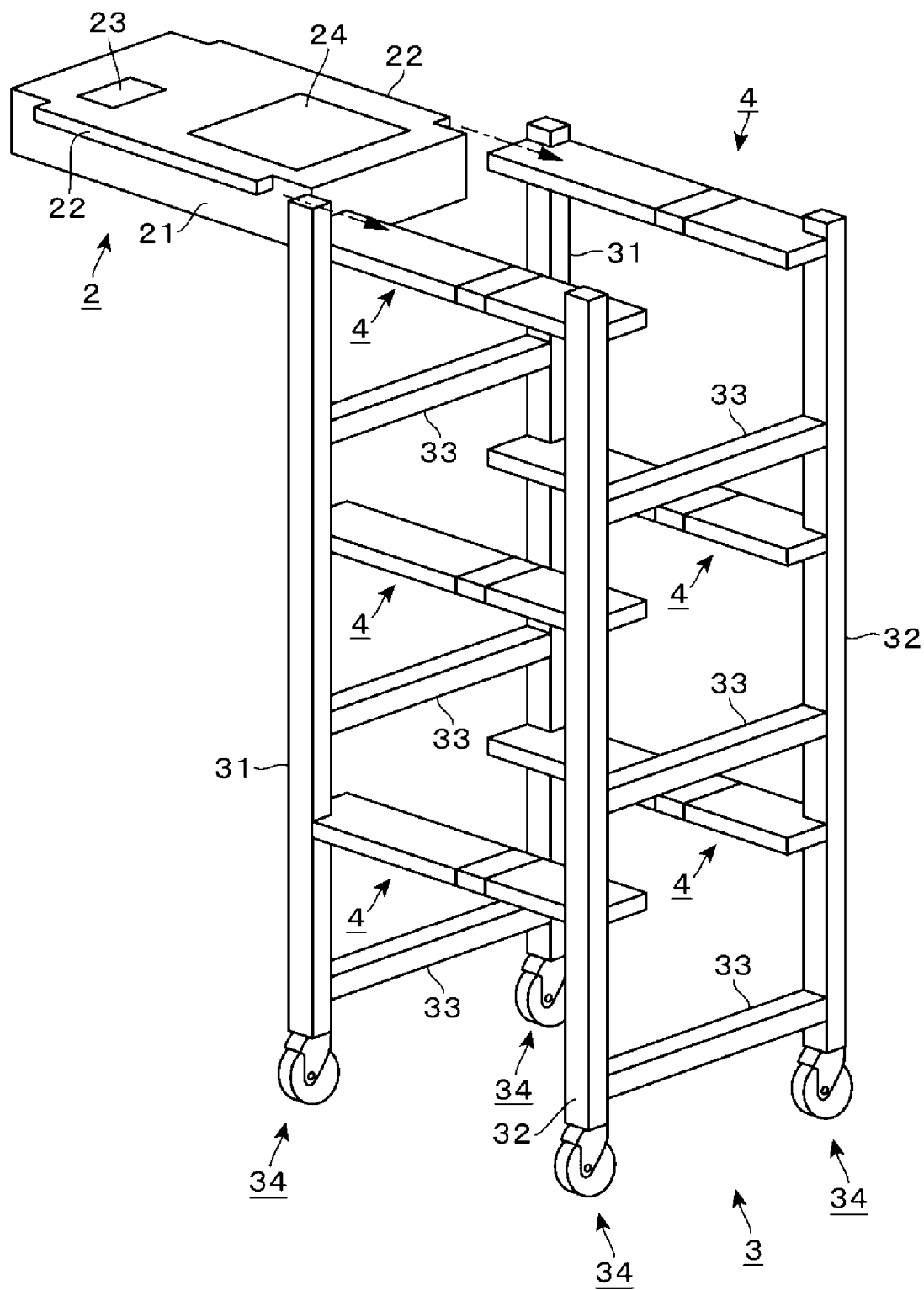

FIG. 2 is a schematic perspective view illustrating the trolley and a tester supported by the trolley.

Figure 3:
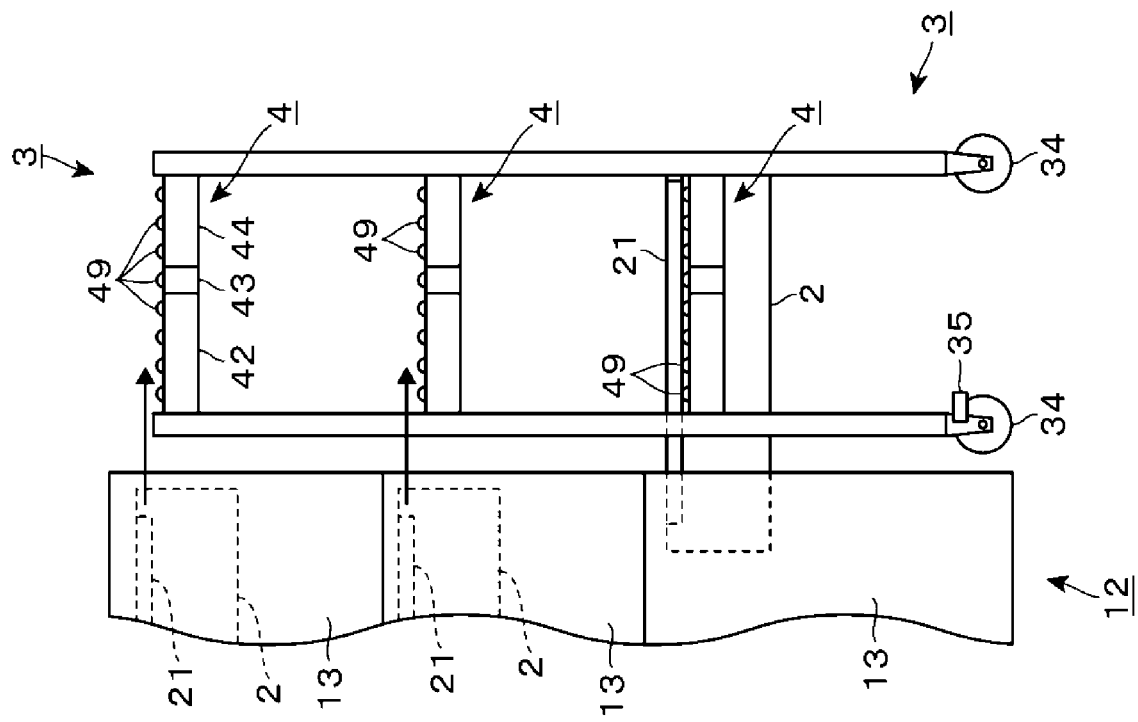
Figure 4:
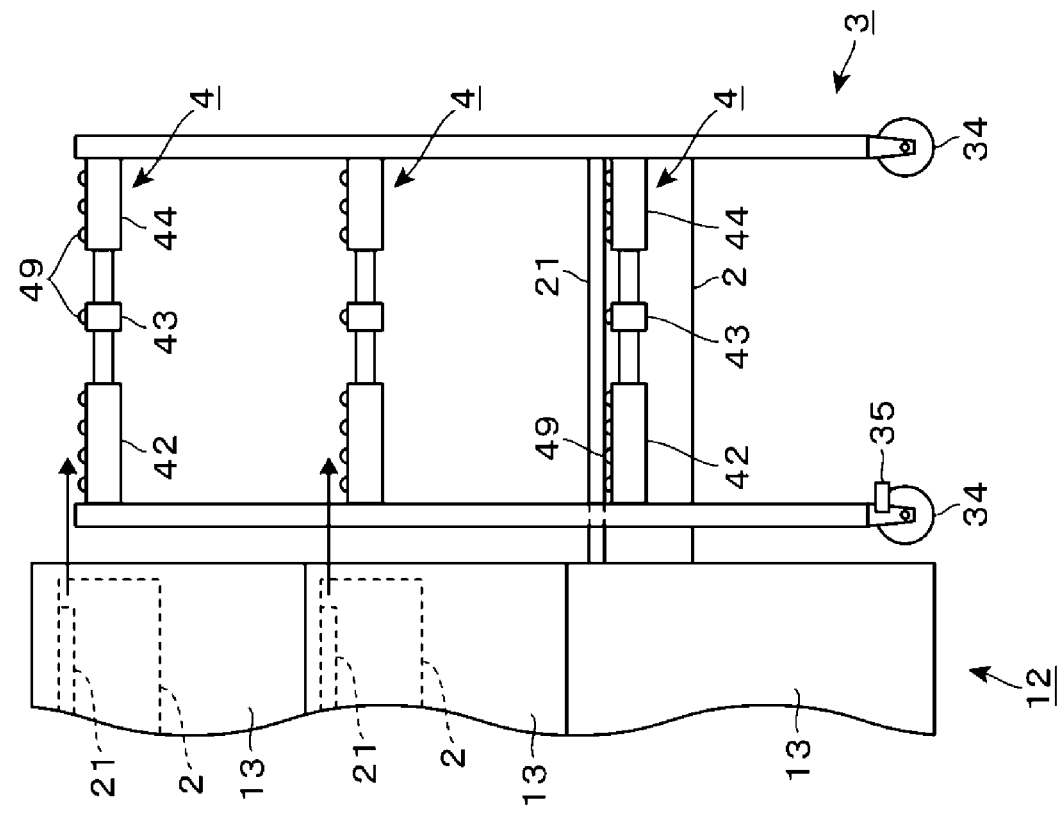
Figure 5:
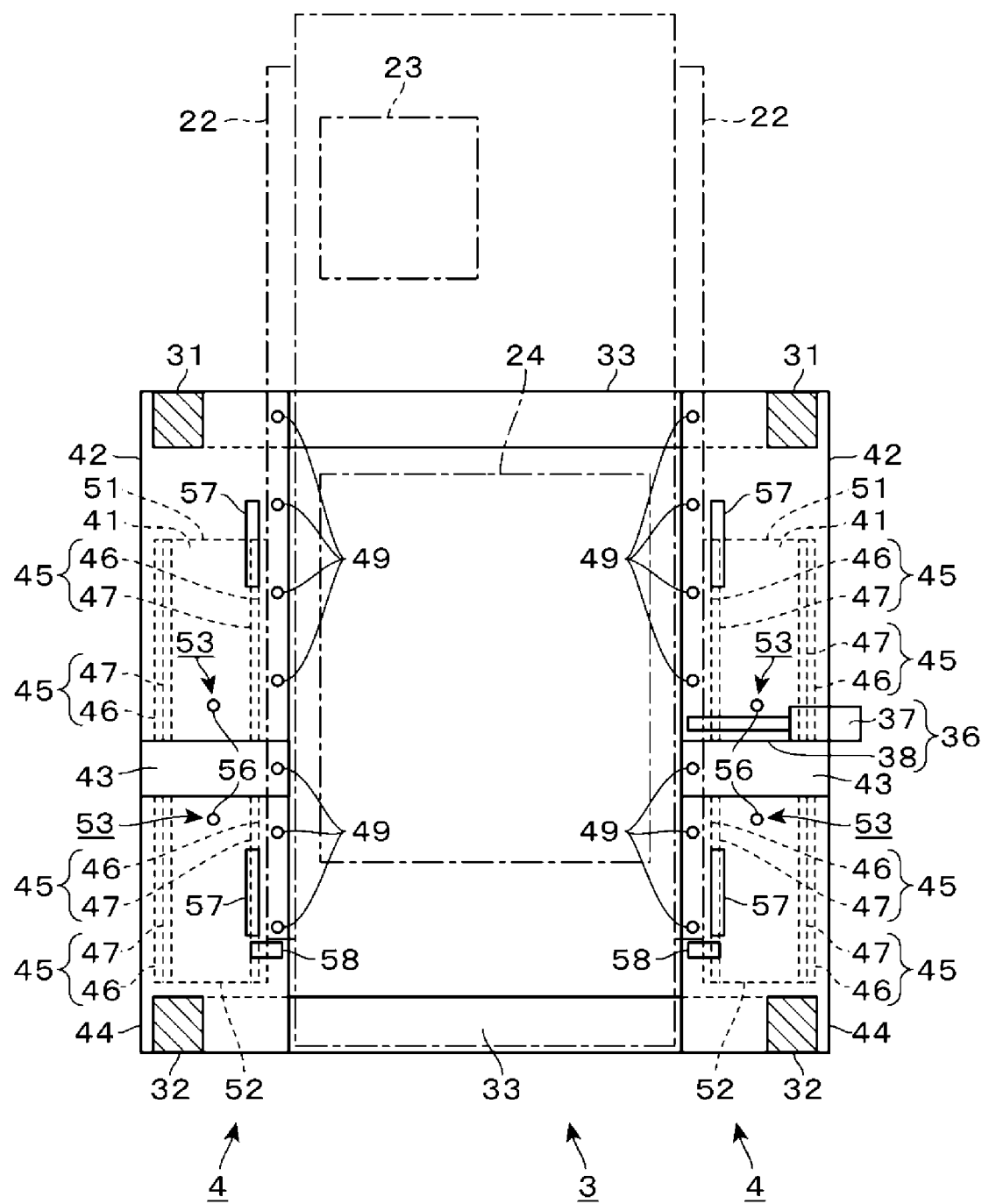
Figure 6:
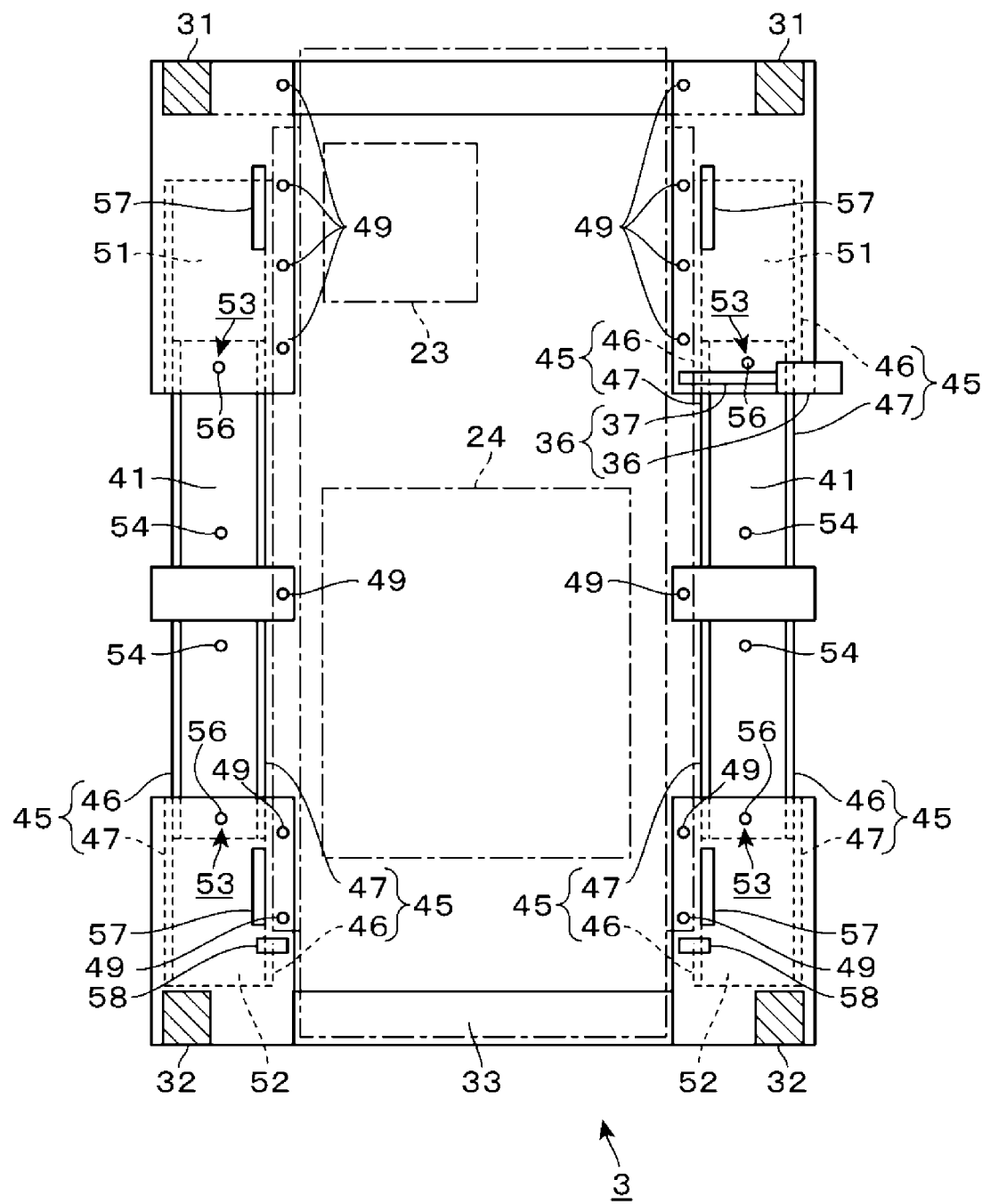
Figure 7:
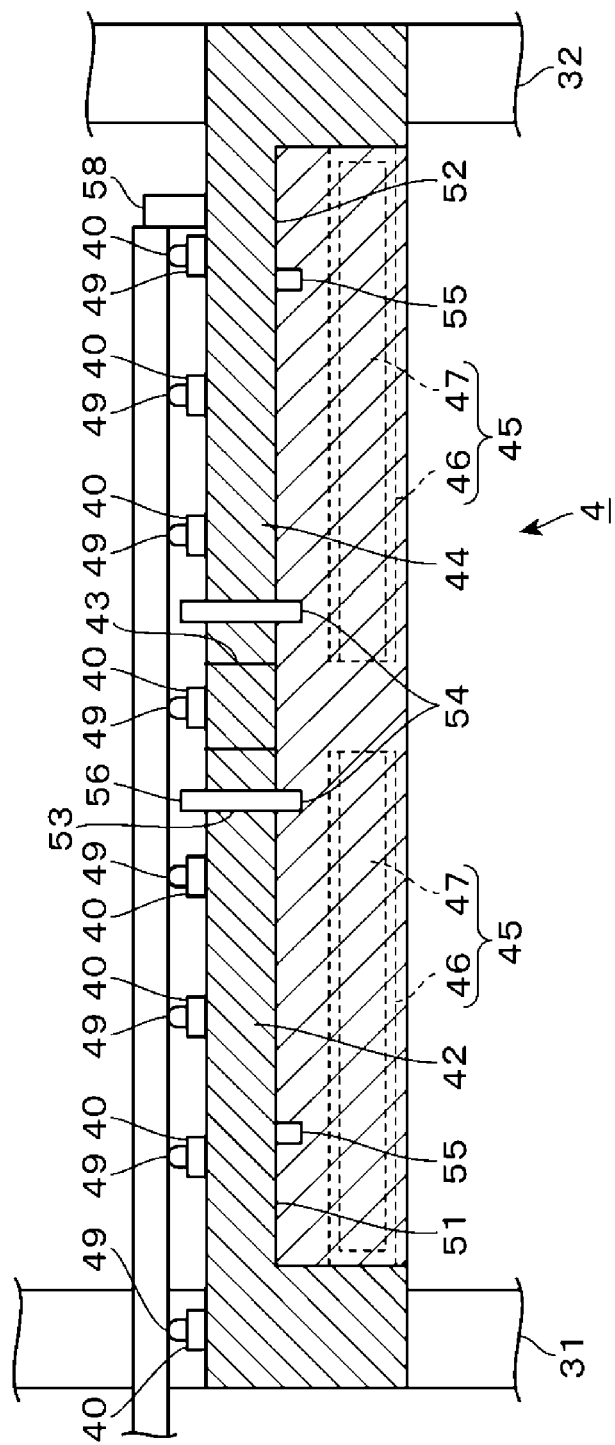
Figure 8:
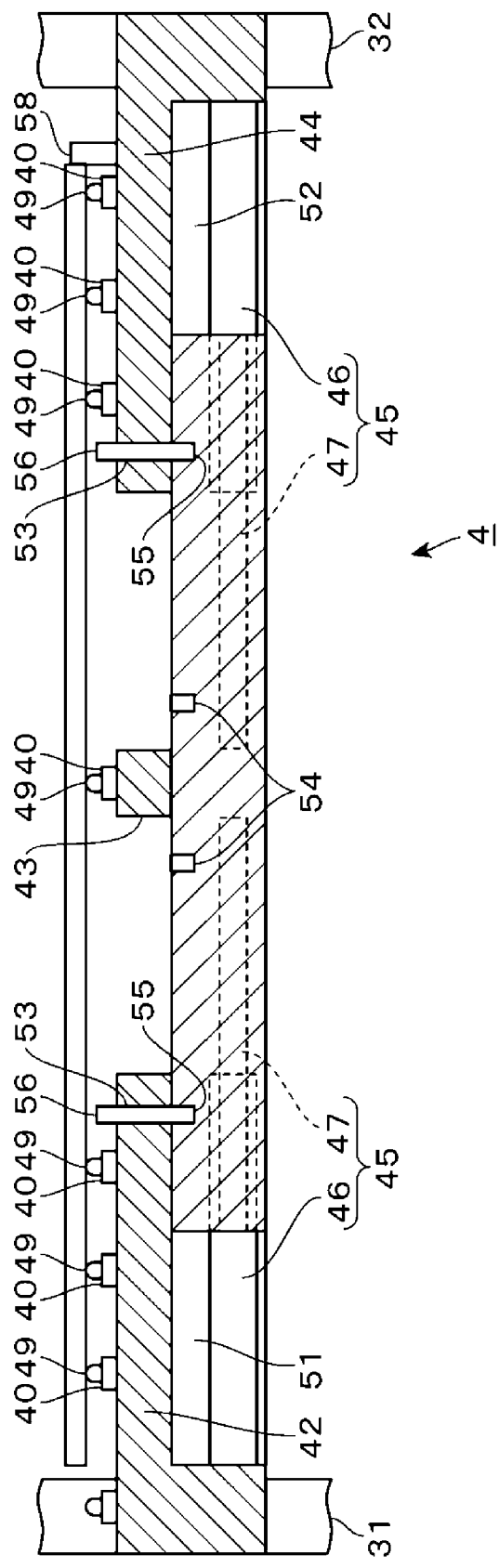
Figure 9:
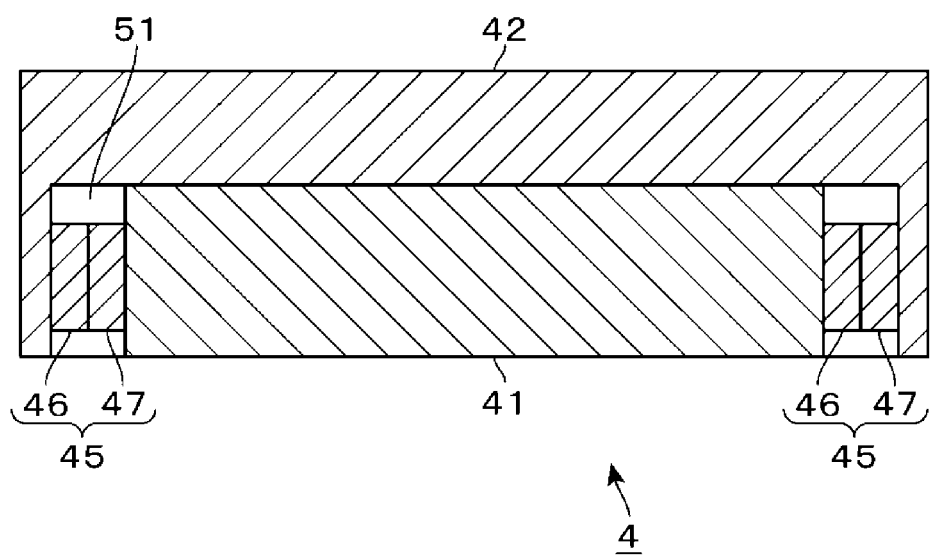
Figure 10:
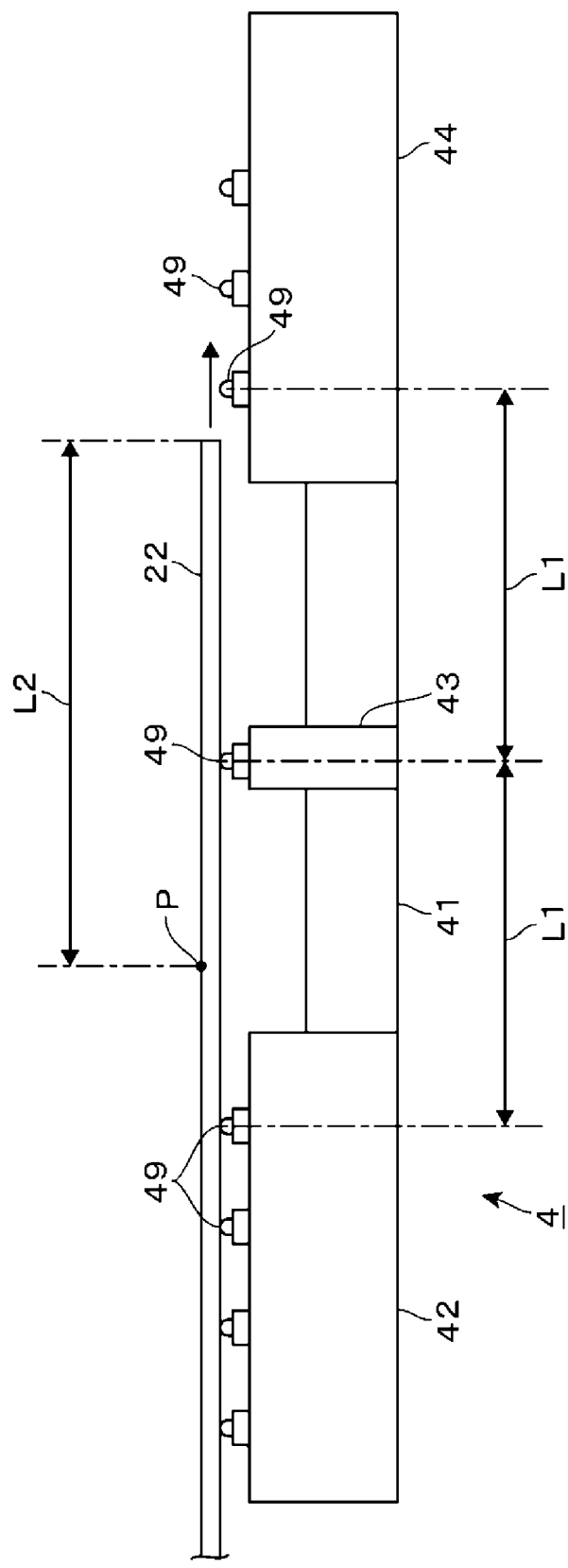
Figure 11:
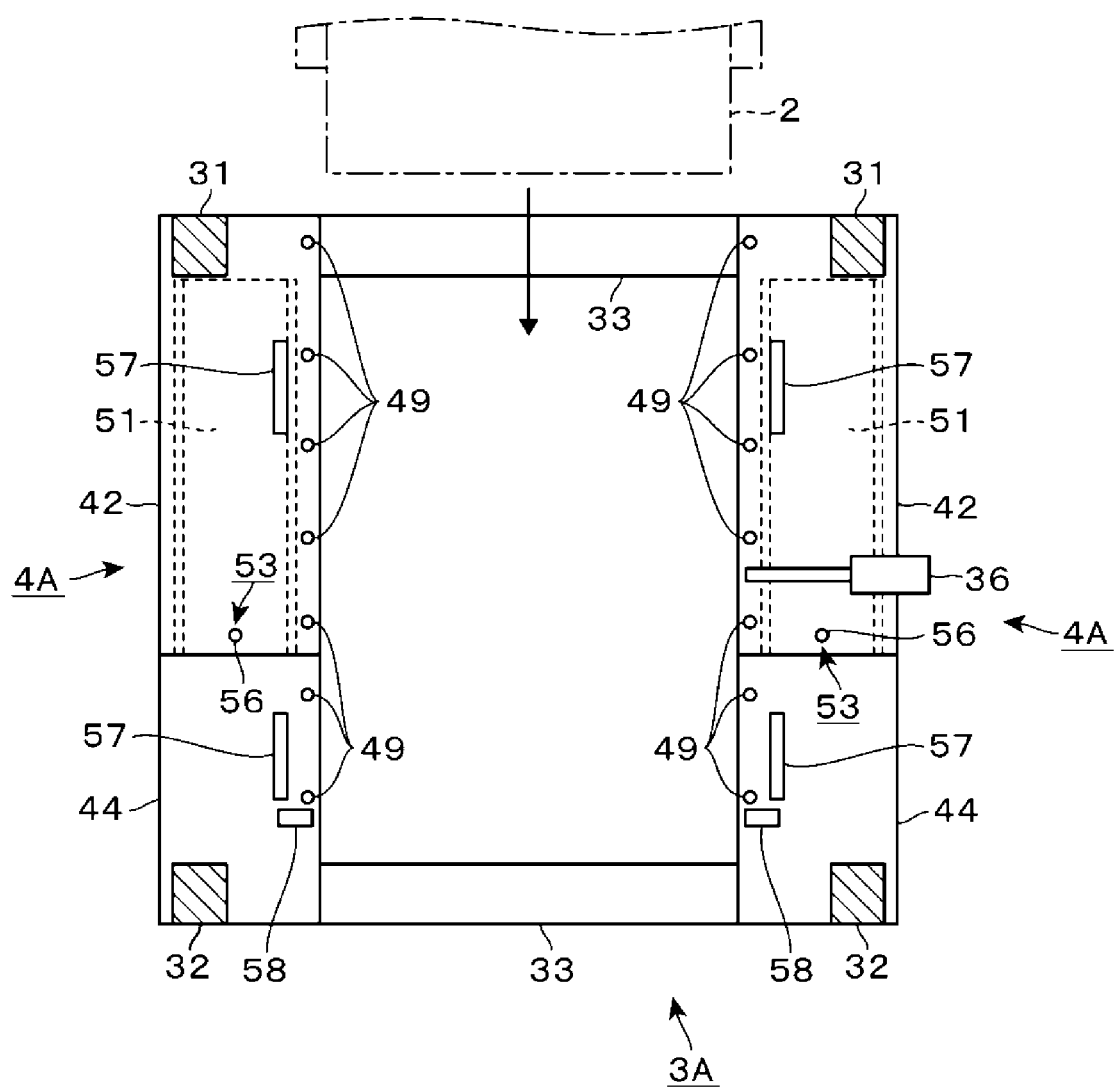
Figure 12:
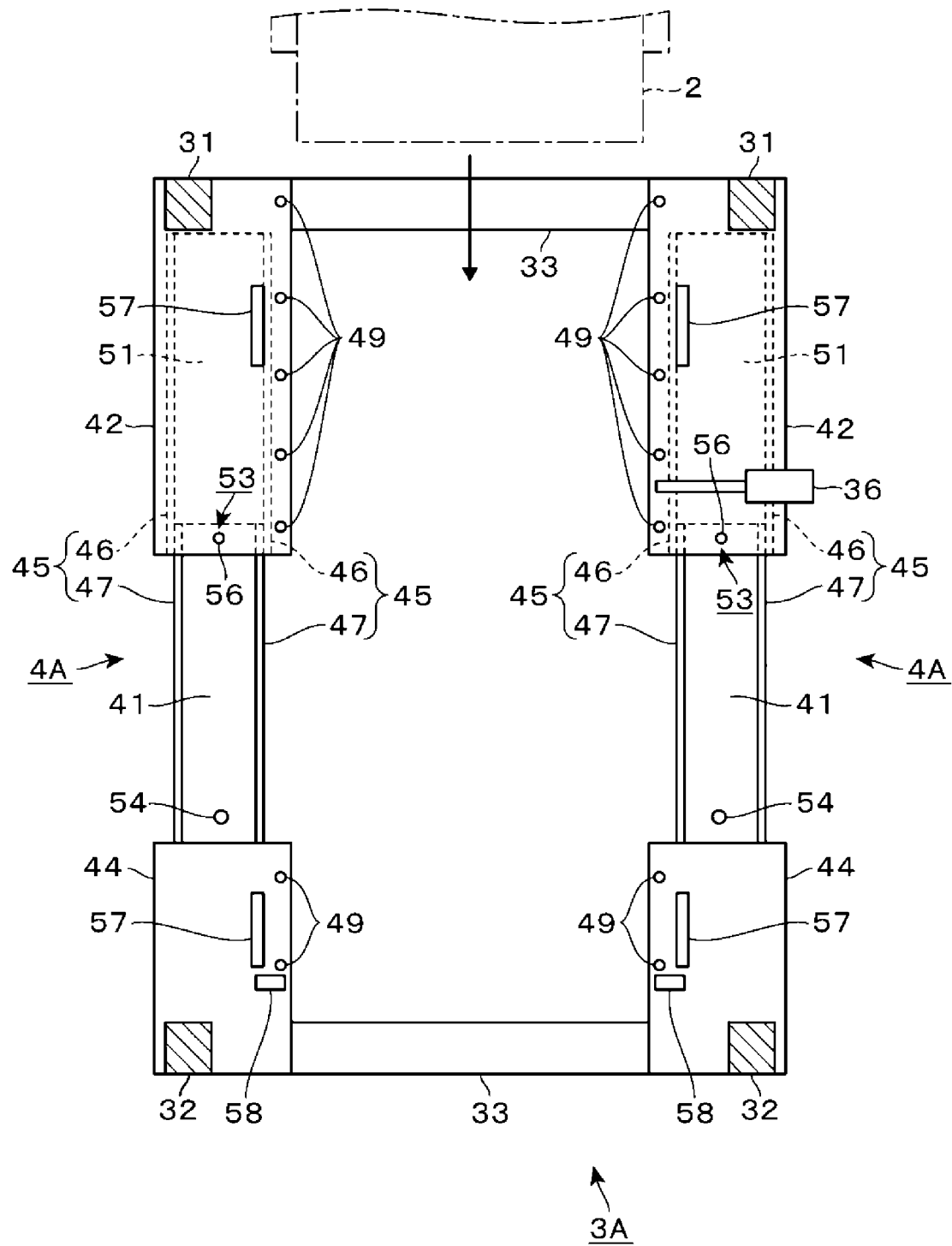
Figure 13:
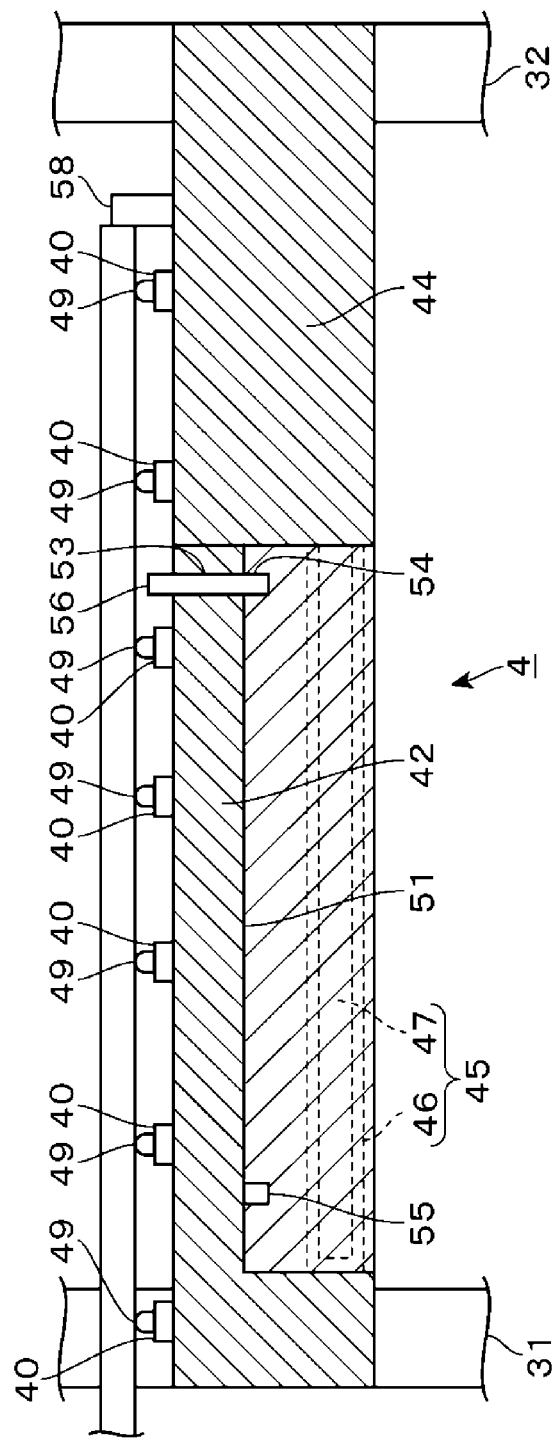
Figure 14:
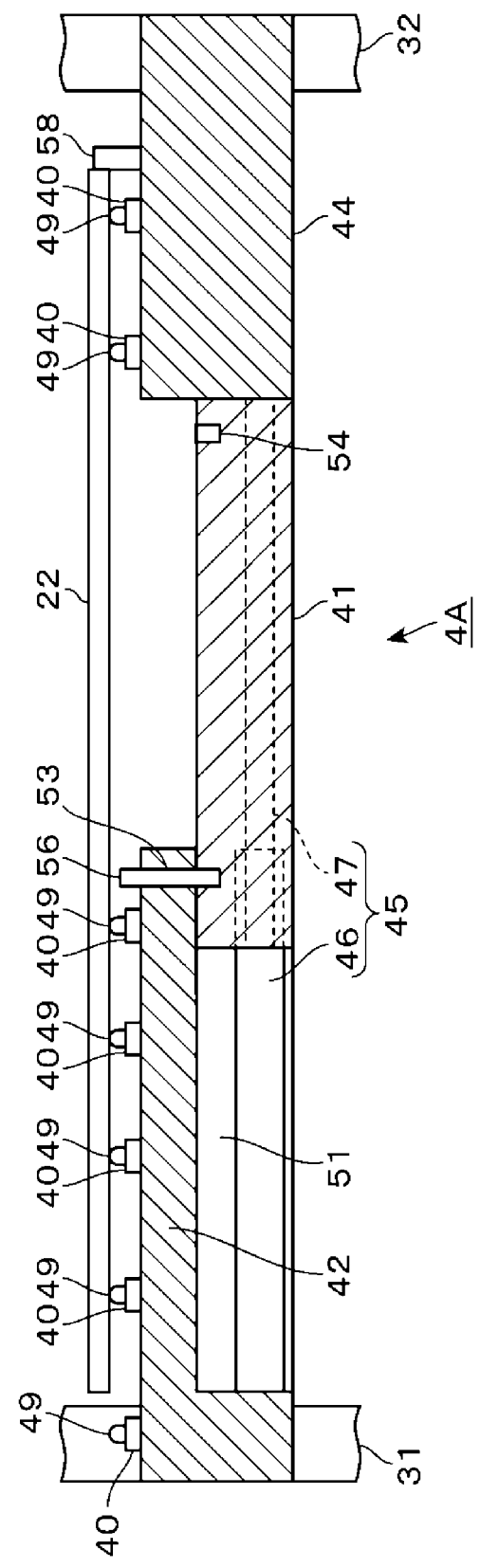
Figure 15:
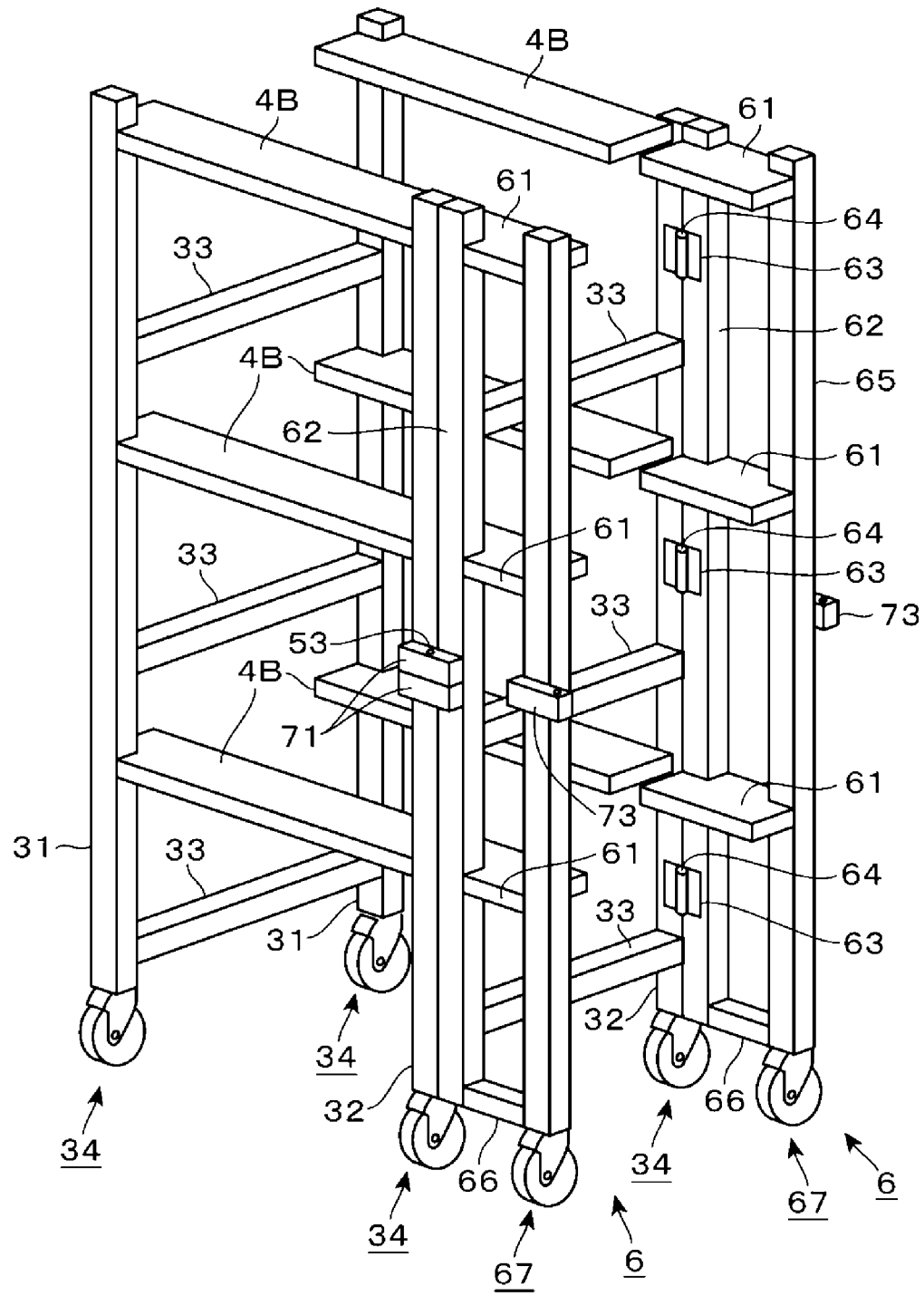
Figure 16:
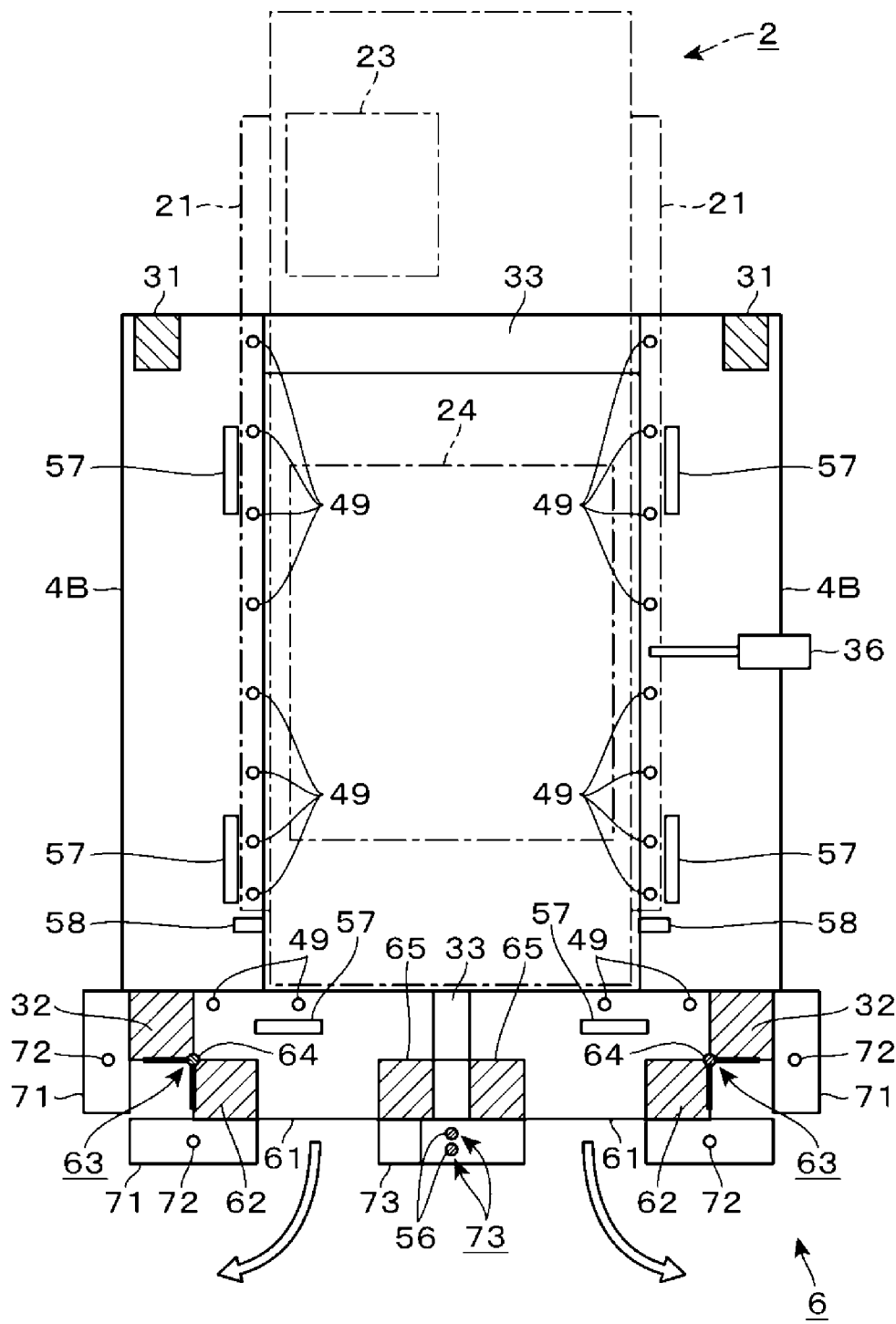
Figure 17:
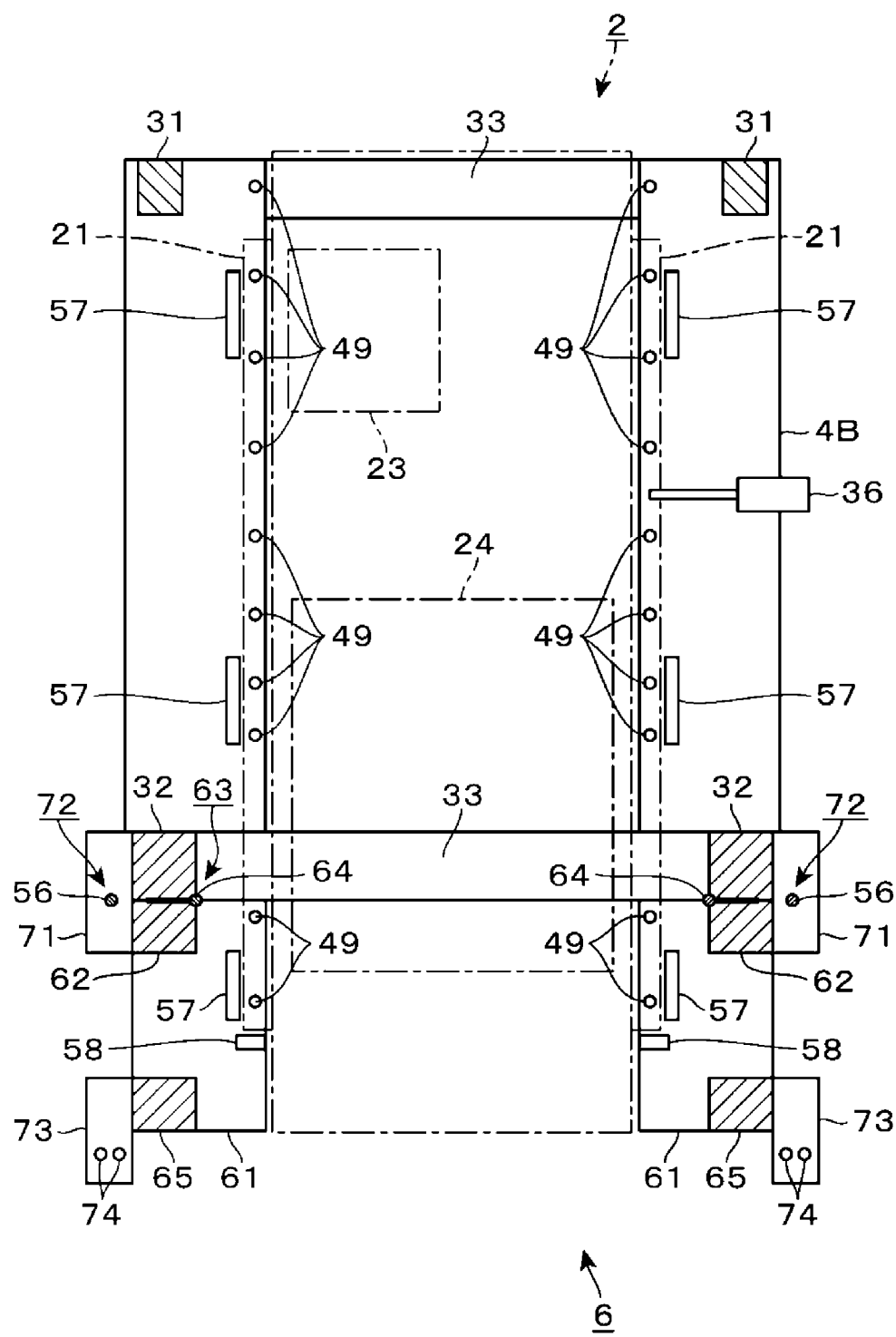
Figure 18:
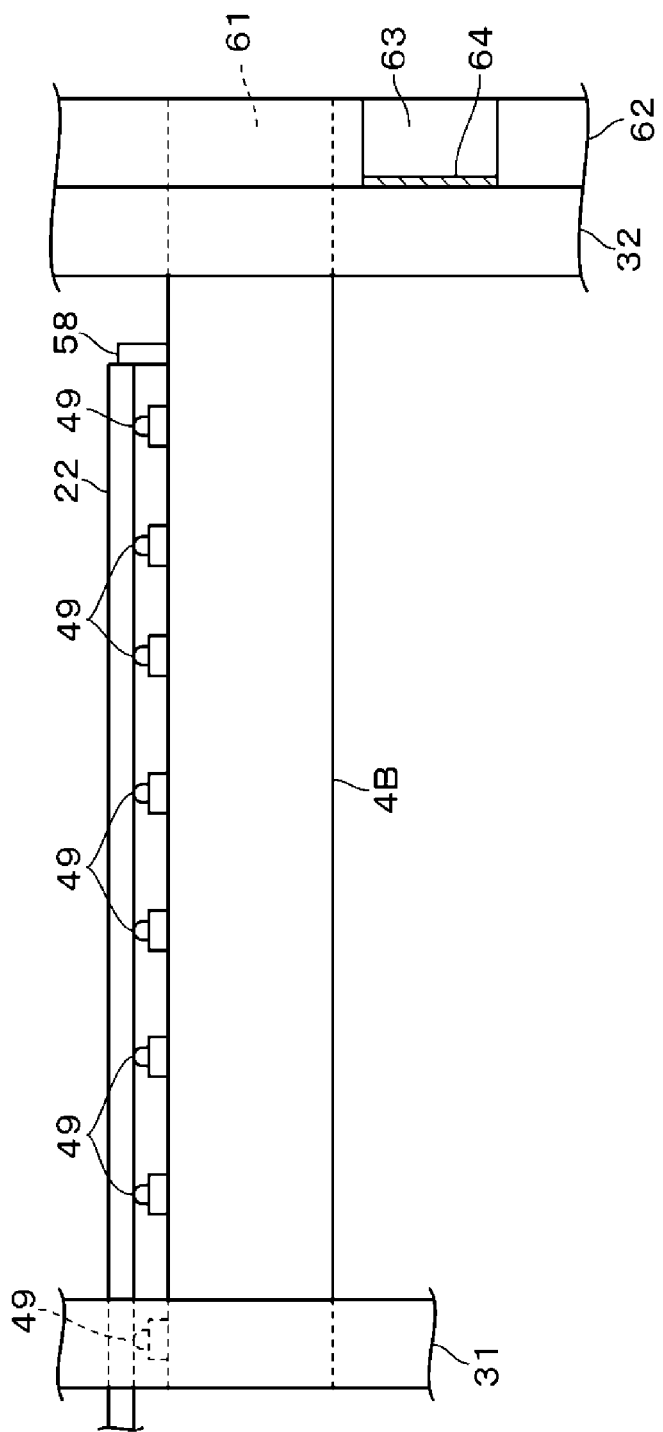
Figure 19:
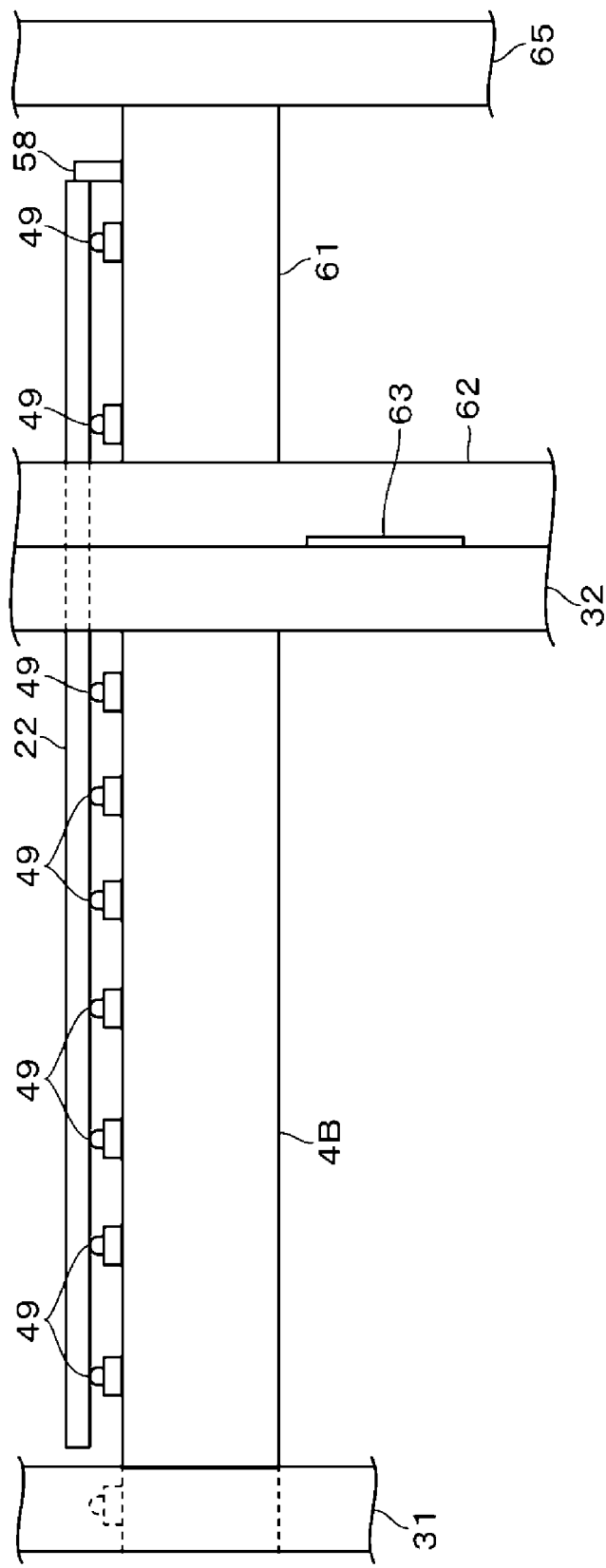
Figure 20:
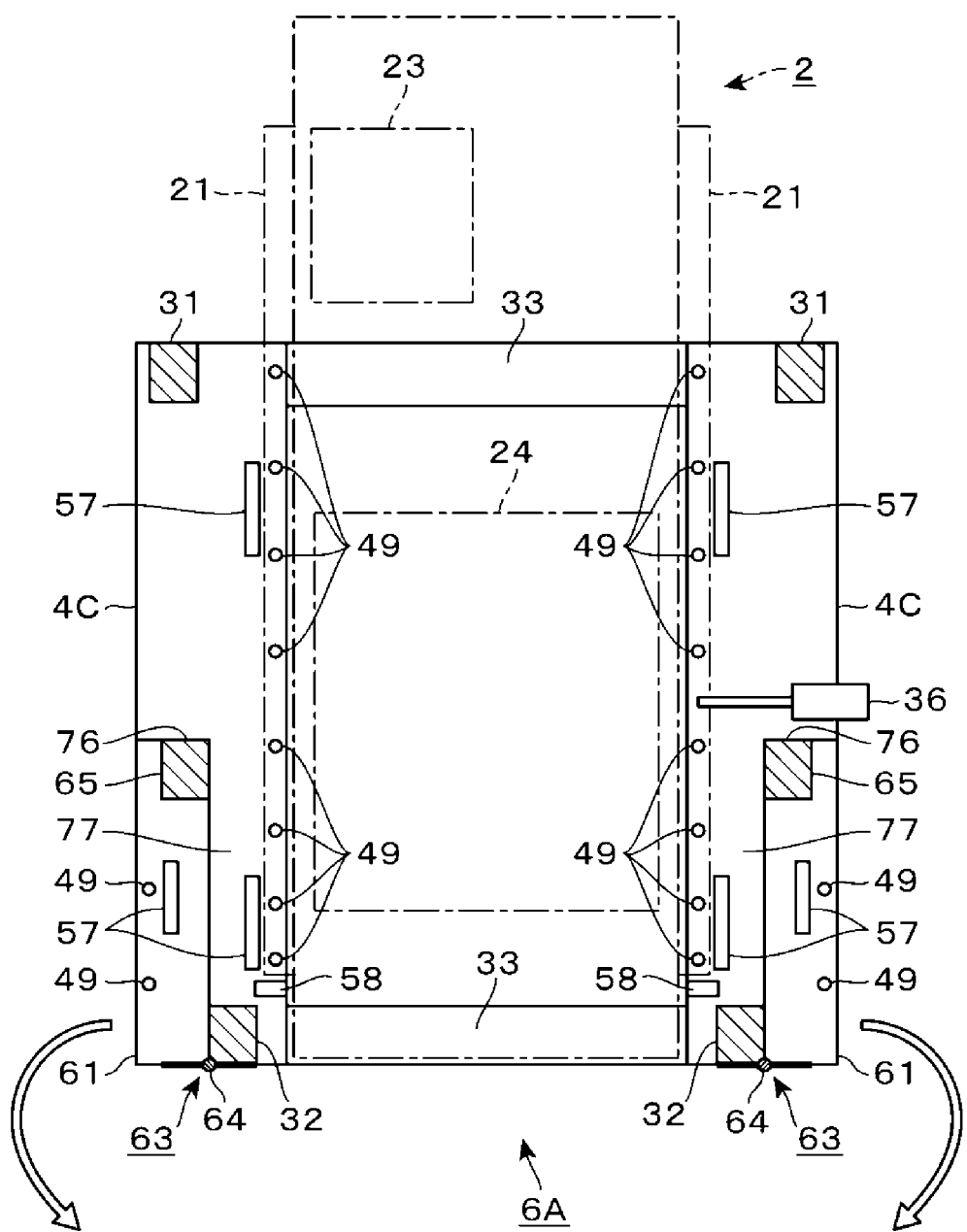
Figure 21:
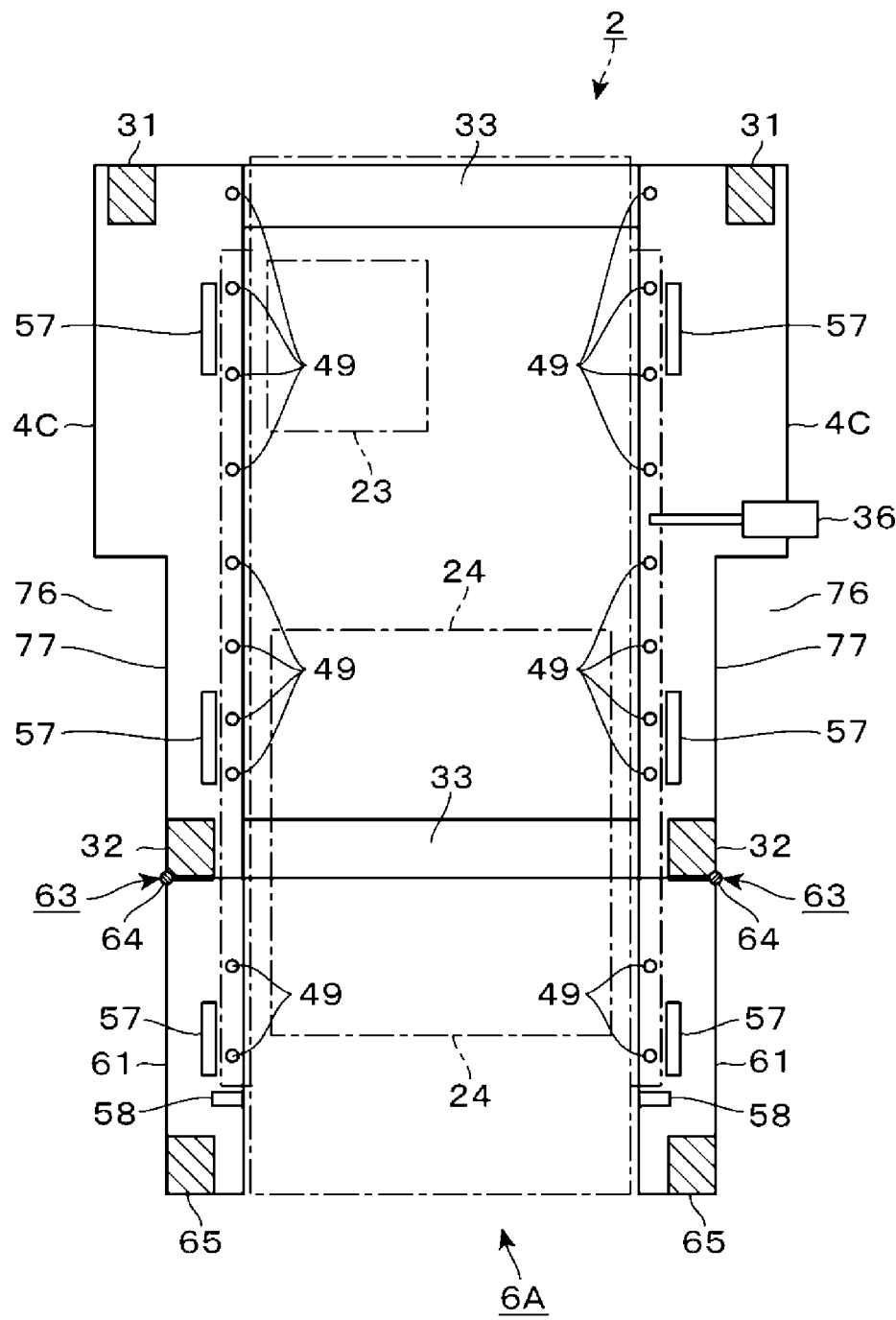
Figure 22:
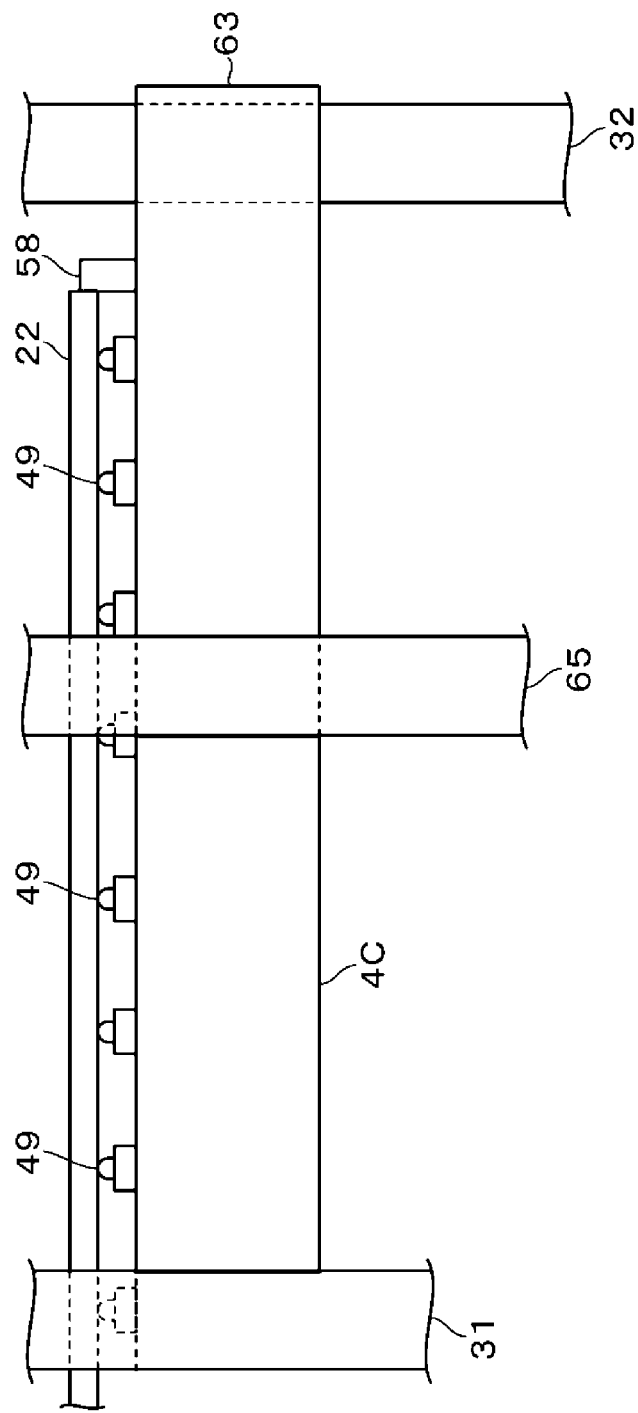
Figure 23:
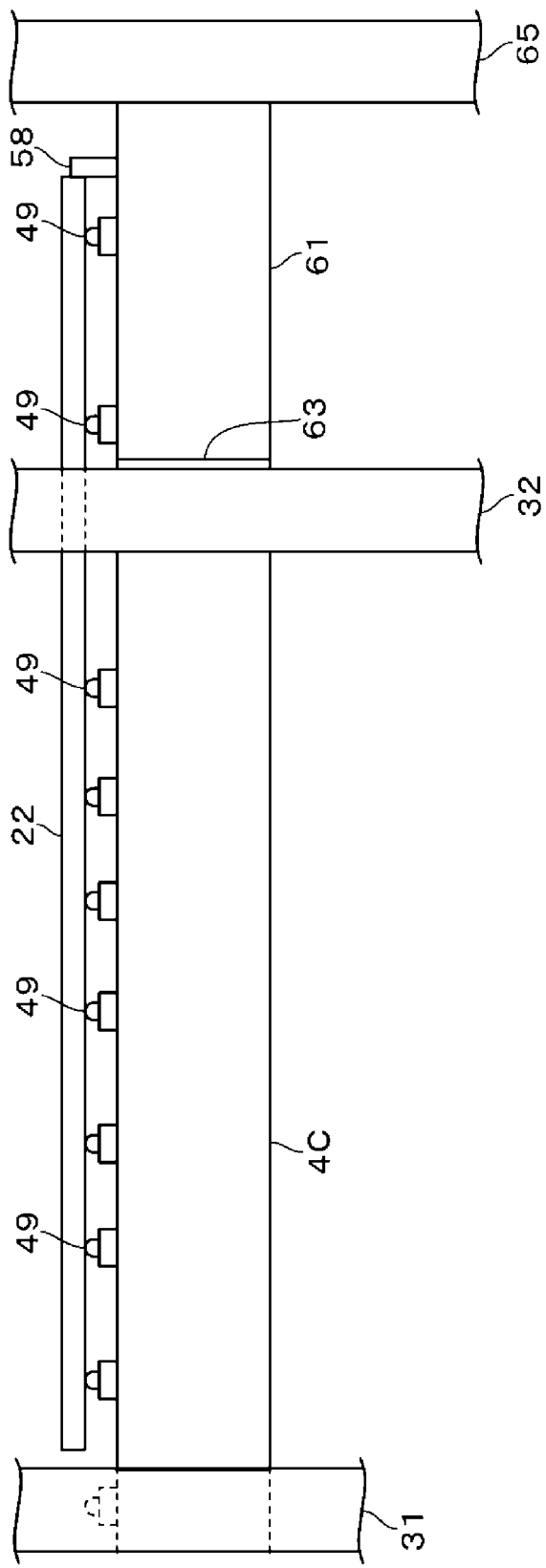

FIG. 3 is a schematic side view of the trolley.
FIG. 4 is a schematic side view of the trolley.
FIG. 5 is a top view of the trolley.
FIG. 6 is a top view of the trolley.
FIG. 7 is a schematic vertical sectional side view of a support base that constitutes the trolley.
FIG. 8 is a schematic vertical sectional side view of the support base that constitutes the trolley.
FIG. 9 is a schematic vertical sectional rear view of the support base.
FIG. 10 is a side view illustrating a position of a ball provided in the support base.
FIG. 11 is a plan view of a trolley according to a second embodiment.
FIG. 12 is a plan view of the trolley.
FIG. 13 is a schematic vertical sectional side view of a support base that constitutes the trolley.
FIG. 14 is a schematic vertical sectional side view of the support base that constitutes the trolley.
FIG. 15 is a perspective view of a trolley according to a third embodiment.
FIG. 16 is a plan view of the trolley.
FIG. 17 is a plan view of the trolley.
FIG. 18 is a schematic side view of a support base that constitutes the trolley.
FIG. 19 is a schematic side view of the support base that constitutes the trolley.
FIG. 20 is a plan view of a trolley according to a fourth embodiment.
FIG. 21 is a plan view of the trolley.
FIG. 22 is a schematic side view of a support base that constitutes the trolley.
FIG. 23 is a schematic side view of the support base that constitutes the trolley.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

(First Embodiment)

A trolley 3 according to a first embodiment of the present disclosure is used for maintenance of a wafer inspecting apparatus 1, which is a substrate processing apparatus installed in a clean room in a plant. First, the wafer inspecting apparatus 1 will be described in detail with reference to FIG. 1, which is a plan view. The wafer inspecting apparatus 1 includes a loader 11 and a cell tower 12. The loader 11 and the cell tower 12 are connected to each other in the lateral direction. In this example, the cell tower 12 is constituted by twelve cells 13, and when viewed in the connection direction between the loader 11 and the cell tower 12, the cells 13 are disposed in a 4×3 matrix. That is, the cell 13 is provided in three tiers in the vertical direction.

The loader 11 is provided with a stage 14 on which a carrier C for storing a wafer W is placed, and a transfer mechanism 15 that delivers the wafer W between the carrier C on the stage 14 and each cell 13. In each cell 13, an inspection on the electrical characteristics such as a conduction state in an electric circuit formed on the wafer W is performed on the transferred wafer W. The cell 13 will be further described. The cell 13 is provided therein with a card-shaped member (not illustrated) and a tester 2 as components of the cell 13. The lower surface of the card-shaped member faces the surface of the wafer W, and a terminal is provided on the lower surface and comes into contact with the surface of the wafer W to perform the inspection.

Referring to the perspective view of FIG. 2, the tester 2 is a member mounted with, for example, a substrate having a circuit for performing the inspection, and is used by being connected to a card-shaped member from above. The tester 2 is configured to be horizontally pulled out to the outside of the cell 13 by an operator in a state of being separated from the card-shaped member, so that the pulled-out portion may be maintained. The pull-out direction is opposite to a side to which the loader 11 is connected, and hereinafter, the pull-out direction will be described as the rear side. The left side and the right side in the following description are the left side and the right side when viewed from the rear side to the front side.

The outer shape of the tester 2 is symmetrical, and is constituted by a body 21 in a rectangular parallelepiped shape that is long in the front-rear direction, and protrusions 22 extending in the front-rear direction on the left and right side surfaces of the body 21. In the cell 13, the protrusions 22, which are supported portions, are supported by supports (not illustrated) from below, and the tester 2 is held in a horizontal posture. Then, on the upper surface side of the body 21, parts 23 and 24 are provided on the front side and the rear side, respectively.

Specifically, the maintenance for the tester 2 includes maintenance (including inspection or replacement) for the parts 23 and 24, and the tester 2 is slid and pulled out from the inside of the cell 13 so as to expose a maintenance target part of the parts 23 and 24. The tester 2 is pulled out in this manner, and the trolley 3 is used to support the portion of the protrusion 22 exposed to the outside of the cell 13 from below. The trolley 3 is freely movable on the floor of the clean room, and is disposed behind the cell tower 12 when the tester 2 is maintained.

However, for example, a plurality of wafer inspecting apparatus 1 may be provided in the clean room and disposed in the front-rear direction. Meanwhile, with respect to the tester 2, it is considered to use a relatively large one. Accordingly, when the wafer inspecting apparatus 1 becomes large and the footprint increases, and when the number of the wafer inspecting apparatus 1 disposed in the clean room is not changed, it may be considered that the front-rear width of the space behind the cell tower 12 becomes relatively narrow. In that case, if the front-rear width of the trolley 3 disposed on the rear side of the cell tower 12 is relatively large, the passage of people between the apparatuses may be always obstructed during the maintenance of the tester 2, and thus, it is required to suppress the occurrence of such a situation.

As described above, the parts 23 and 24 are provided at different positions in the tester 2 in the front-rear direction. Thus, when the rear side part 24 is maintained, the pull-out amount of the tester 2 may be smaller than the case where the front side part 23 is maintained. Therefore, the pull-out amount of the tester 2 may also be small with respect to the width of the pull-out direction of the trolley 3 that supports the tester 2 (width in the lateral direction). Therefore, the trolley 3 is configured such that the lateral width is changed according to the pull-out amount of the tester 2 from the cell 13.

FIG. 2 is a schematic perspective view of the trolley 3, and FIGS. 3 and 4 are schematic side views of the trolley 3. When the part 24 is maintained, the trolley 3 is disposed on the rear side of the cell tower 12 in a state where the front-rear width becomes a first length, which is relatively small, as illustrated in FIG. 3, while the rear side of the tester 2 is supported by the trolley 3, and the front side of the tester 2 is supported by the cell 13. When the part 23 is maintained, the trolley 3 is disposed on the rear side of the cell tower 12 in a state where the front-rear width becomes a second length larger than the first length as illustrated in FIG. 4, while the tester 2 is entirely pulled out from the cell 13 and supported by the trolley 3. That is, the trolley 3 supports the tester 2 pulled out to the outside of the apparatus by a first pull-out amount, which is relatively small, in the state of the first length, and supports the tester 2 pulled out to the outside of the apparatus by a second pull-out amount, which is larger than the first pull-out amount, in the state of the second length.

Prior to describing the configuration of the trolley 3 in detail, the schematic configuration will be described with reference to FIGS. 2 to 4. The trolley 3 is movable as described above, but unless otherwise specified, front, rear, left, and right used in the following description of the trolley 3 are the front, rear, left, and right in a state where the tester 2 is disposed at the rear side of the cell tower 12 to support the tester 2 as described above. In order to pull out and support the tester 2 from the three-tier cell 13 arranged in the vertical direction described above, the trolley 3 includes support bases 4 in three tiers in the vertical direction according to the height of each cell 13. Then, according to the arrangement of the protrusion 22 of the tester 2 described above, two support bases 4 in each tier are provided in a pair separated from each other in the left-right direction. Therefore, a total of six support bases 4 are provided, and one tester 2 is supported by two support bases 4 on the left and the right.

The support base 4 may be expanded and contracted in the front-rear direction, and the front-rear width of the trolley 3 is changed as illustrated in FIGS. 3 and 4 by switching between the contracted state and the expanded state. Further, a plurality of balls 49, which is a rolling body, is provided on each support base 4 in the front-rear direction (not illustrated in FIG. 2), and the balls 49 directly support the pulled-out protrusion 22 from below. That is, when the tester 2 is pulled out, the balls 49 in contact with the protrusion 22 are configured to be rolled according to the movement of the protrusion 22, and the pull-out may be performed with a relatively small force. Even when the pulled-out tester 2 is returned to the cell 13, the returning may be performed with a relatively small force by the rolling of the balls 49.

Hereinafter, descriptions will be made with reference to FIGS. 5 and 6, which are top views of the trolley 3, and FIGS. 7 and 8, which are schematic vertical sectional views of the support base 4. FIGS. 5 and 7 illustrate a state where the front-rear width of the trolley 3 has the first length (accordingly, the support base 4 is in the contracted state) as in FIGS. 2 and 3, and FIGS. 6 and 8 illustrate a state where the front-rear width of the trolley 3 has the second length (accordingly, the support base 4 is in the expanded state) as in FIG. 4.

The trolley 3 includes four columns extending in the vertical direction. With respect to the columns, the columns disposed on the left and the right on the front side are indicated by 31, and the columns disposed on the left and the right on the rear side are indicated by 32. Each of the columns 31 and each of the columns 32 are connected by beams 33, respectively, and the beam 33 extends in the left-right direction, and is provided in a plurality of tiers in the vertical direction. The columns 31 and 32 arranged in the front-rear direction are connected to each other via the support base 4.

Casters 34 are provided in the lower ends of the columns 31 and 32 (see FIGS. 3 and 4), and each caster 34 may rotate around a vertical axis and change the direction thereof. Therefore, as described above, the trolley 3 may be freely moved on the floor to a desired arrangement by rolling wheels that constitutes the casters 34. The caster 34 of the column 31 is provided with a stopper 35, and the wheel of the caster 34 may be fixed.

The support base 4 in each tier is identically configured. Further, the support bases 4 on the left and the right paired with each other in the same tier are formed substantially mirror-symmetrically with respect to the center of the trolley 3 in the left-right direction. Here, among the support bases 4 on the left and the right sides, the support base 4 on the right side will be representatively described. As described above, the support bass 4 is expanded and contracted, but is configured as a flat rectangular parallelepiped in the contracted state. The front end thereof is supported by the column 31, and the rear end thereof is supported by the column 32. Then, the support base 4 is provided such that the longer side is aligned in the front-rear direction in top view, and protrudes from the columns 31 and 32 toward the center of the trolley 3 in the left-right direction in front view.

As illustrated in FIGS. 5 to 8, the support base 4 is constituted by a base 41, a front base 42, an intermediate base 43, a rear base 44, and a sliding portion 45. Four sliding portions 45 are provided, and are constituted by a rail 46 and a rail 47 that are slidably engaged with each other in the extending direction, respectively. The front base 42, the intermediate base 43, and the rear base 44 are members configured to support the protrusion 22 of the tester 2, are formed in a flat rectangular parallelepiped shape, and are provided in this order from the front to the rear. Therefore, the front base 42 forms a front end of the support base 4 that is connected to the column 31, and the rear base 44 forms a rear end of the support base 4 that is connected to the column 32. The front-rear lengths are set as follows: front base 42>rear base 44>intermediate base 43.

The base 41 is a plate-shaped body that is long in the front-rear direction and is thick in the thickness, and the lower side of the intermediate base 43 penetrates the base 41 and is fixed to the central portion of the base 41 in the longitudinal direction. Therefore, depending on the angle of the viewpoint, the front side or the rear side of the base 41 protrudes from the intermediate base 43. Then, a recess 51 is formed below the rear side of the front base 42, the front side of the base 41 is advanced into the recess 51, and the recess 51 and the front side of the base 41 are connected with each other by two sliding portions 45 (one sliding portion) provided symmetrically. More specifically, as illustrated in FIG. 9, which is a schematic vertical sectional rear view, the rail 46 (first sliding member) of each sliding portion 45 is fixedly provided on the left side wall and the right side wall of the recess 51, and the rail 47 (second sliding member) of each sliding portion 45 is fixedly provided on the left side surface and the right side surface of the front side of the base 41.

Further, a recess 52 is formed below the front side of the rear base 44, the rear side of the base 41 is advanced into the recess 52, and the recess 52 and the rear side of the base 41 are connected with each other by two sliding portions 45 (the other sliding portion). More specifically, the rail 46 (first sliding member) of each sliding portion 45 is fixedly provided on the left side wall and the right side wall of the recess 52, and the rail 47 (second sliding member) of each sliding portion 45 is fixedly provided on the left side surface and the right side surface of the rear side of the base 41. Therefore, the intermediate base 43 is provided with the rail 47 on each of the front side and the rear side via the base 41. With the configuration described above, the front base 42 and the rear base 44 may be slidably moved with respect to the base 41. In the contracted state of the support base 4, the front base 42 and the rear base 44 are in contact with the front and the rear of the intermediate base 43, respectively, and in the expanded state of the support base 4, the front base 42 and the rear base 44 are separated from the intermediate base 43.

The front base 42 corresponds to a first support, and the intermediate base 43 and the rear base 44 correspond to a second support. Further, the intermediate base 43 corresponds to an intermediate support, and the rear base 44 corresponds to an end side support provided on a side opposite to the front base 42 with respect to the intermediate base 43 in the front-rear direction. In addition, each position of the intermediate base 43 and the rear base 44 with respect to the front base 42 in the contracted state described above is a first position, and each position of the intermediate base 43 and the rear base with respect to the front base 42 in the expanded state is a second position. As described above, since the support base 4 is provided on the left and the right, a set including the front base 42, the intermediate base 43, and the rear base 44 is provided on the left and the right.

In the upper surface of the front base 42 and the upper surface of the rear base 44, a through hole 53 having a small diameter is provided to be opened to both the recess 51 and the recess 52. Further, in the upper surface of the base 41, two recesses are provided to be separated from each other in the front-rear direction on the front side from the intermediate base 43, and two recesses are provided to be separated from each other in the front-rear direction on the rear side of the intermediate base 43. In this manner, one of two recesses formed on both the front side and the rear side with respect to the intermediate base 43, which is near the intermediate base 43, is a recess 54, and the other recess, which is far from the intermediate base 43, is a recess 55. The left-right positions of the recesses 54 and 55 and the left-right position of the through hole 53 are aligned, and the through hole 53 may be overlapped with one of the recess 54 and the recess 55 by expanding and contracting the support base 4.

A pin 56 is inserted into each through hole 53 from above the front base 42, and the lower end of the pin 56 is advanced into the recess 54 or the recess 55. Thus, the relative position of the front base 42 and the intermediate base 43 in the front-rear direction may be fixed. Further, the pin 56 is inserted into the through hole 53 from above the rear base 44, and the lower end of the pin 56 enters into the recess 54 or the recess 55, and thus, the relative position of the rear base 44 and the intermediate base 43 in the front-rear direction may be fixed. When the support base 4 is fixed in the contracted state, the pin 56 is advanced into the recess 54. When the support base 4 is fixed in the expanded state, the pin 56 is advanced into the recess 55.

Each of the upper surfaces of the front base 42 and the rear base 44 is provided with a position regulating portion 57, which is a protrusion extending in the front-rear direction. The position regulating portion 57 is disposed in a position near the center of the trolley 3 in the left-right direction, and abuts on the protrusion 22 of the pulled-out tester 2. Thus, the left-right position of the tester 2 is regulated. Further, on the upper surface of the rear base 44, a stopper 58, which is a protrusion extending in the left-right direction, is provided on the rear side of the position regulating portion 57. The stopper 58 abuts on the rear end of the protrusion 22 of the pulled-out tester 2, and regulates the front-rear position of the tester 2.

In the upper surface of each of the front base 42, the intermediate base 43, and the rear base 44, the above-described balls 49 are provided, and the balls 49 are arranged in a row in the front-rear direction at intervals at the positions near the center of the trolley 3 in the left-right direction from the position regulating portion 57. As illustrated in FIGS. 7 and 8, the balls 49 are provided on the front base 42, the intermediate base 43, and the rear base 44 via a pedestal 40. In order to avoid complication of the drawings, in the drawings illustrating the first embodiment, the illustration of the pedestal 40 is omitted in each of the drawings other than FIGS. 7 and 8, and FIG. 10 to be described later. In this example, a plurality of balls 49 is provided in each of the front base 42 and the rear base 44, and one ball 49 is provided in the intermediate base 43.

Further, a lock mechanism 36 is provided on the rear end side of the front base 42. The lock mechanism 36 includes a body 37 fixed to the front base 42, and a tip end 38 protruding toward the center side of the trolley 3 in the left-right direction from the body 37. The protruding amount of the tip end 38 may be freely adjusted. By adjusting the protruding amount, the tip end 38 is advanced into a hole (not illustrated) formed on the side surface of the body 21 of the tester 2 pulled out to the trolley 3. Therefore, the tester 2 may be fixed to the trolley 3. As described above, the support base 4 on the right side and the support base 4 on the left side are in the substantially mirror-symmetrical relationship, but the lock mechanism 36 is provided in the support base 4 on the right side. In the trolley 3 configured as described above, the front base 42, the column 31, and the caster 34 thereunder constitutes a trolley body.

Subsequently, descriptions will be made on a procedure for supporting the tester 2 on the trolley 3 when the front side part 23 of the tester 2 is maintained. It is assumed that the trolley 3 has the first length illustrated in, for example, FIGS. 3 and 5 by fixing the support base 4 in the contracted state, and the trolley 3 is waited at a position outside a region where the tester 2 is pulled out on the rear side of the cell tower 12. An operator adjusts the direction of the trolley 3 so as to be aligned the longitudinal direction of the support base 4 in the front-rear direction, and approaches the trolley 3 to the rear side of the cell 13 including the tester 2, which is a maintenance target. Then, the operator fixes the wheel of the caster 34 by the stopper 35 of the caster 34 on the front side, thereby fixing the position of the column 31 of the front side of the trolley 3.

Subsequently, the operator removes each pin 56 from the support base 4 so that the length of the support base 4 is changeable, and then, pulls the column 32 of the rear side of the trolley 3 to the rear side, and shifts the position of the column 32 using the caster 34 of the rear side connected to the column 32. Therefore, the support bases 4 at the three tiers in the vertical direction collectively come into the expanded state, and the front-rear width of the trolley 3 is expanded. Thus, the length of the trolley 3 becomes the second length described in, for example, FIGS. 4 and 6. Thereafter, the operator inserts the removed pin 56 into the support base 4 to fix the support base 4 in the expanded state.

Then, the operator horizontally moves and pulls out the tester 2 from the cell 13 including the tester 2, which is a maintenance target. Therefore, the body 21 of the tester 2 is advanced into a gap between the support bases 4 arranged in the left-right direction, and the rear end of the protrusion 22 of the tester 2 is put on the balls 49 of the front side of the support base 4 in the tier at the height corresponding to the cell 13, and each of the cell 13 and the trolley 3 support the tester 2. The operator further pulls out the tester 2 to the rear side, and the protrusions 22 moves on the row of the balls 49. As described above, the balls 49 that support the protrusion 22 roll along with the movement of the protrusion 22.

Then, when the rear end of the protrusion 22 abuts on the stopper 58, and the entire tester 2 is pulled out and supported by the trolley 3, the operator fixes the tester 2 to the trolley 3 by the lock mechanism 36. FIGS. 6 and 8 illustrate the tester 2 and the protrusion 22 of the tester 2 in a state where the pull-out is completed in this manner, respectively. Since the part 23 is exposed to the outside of the cell 13, the operator may maintain the part 23. After the maintenance, the tester 2 is returned from the trolley 3 to the cell 13 in the reverse procedure of the procedure described above, and the trolley 3 is retracted from the rear side of the cell tower 12.

Descriptions have been made on the case where the front side part 23 of the tester 2 is maintained. However, when the rear side part 24 of the tester 2 is maintained, the operation is performed in the same procedure as the case where the part 23 is maintained, except that the pin 56 is not attached/detached, and the tester 2 is pulled out while the substrate base 4 is in the contracted state (i.e., the trolley 3 has the first length). FIGS. 5 and 7 illustrate the tester 2 and the protrusion 22 of the tester 2 in a state where the pull-out is completed in this manner while the trolley 3 has the first length, respectively. In this state, the front end side of the tester 2 is supported by the cell 13, and the rear end side of the tester 2 is supported by the trolley 3, so that only the part 24 of the parts 23 and 24 is exposed to the outside of the cell 13. Thus, the part 24 may be maintained.

However, the arrangement of the balls 49 and the positional relationship with the tester 2 will be described with reference to FIG. 10, which is a side view when the support base 4 is pulled out in the expanded state as described above. A point P illustrates the center of gravity of the tester 2 in a side view. With respect to a plurality of balls 49 arranged in the front-rear direction, the largest distance among the distances between the adjacent balls 49 is set to L1. Specifically, the distance between the ball 49 disposed on the rearmost end side of the front base 42 and the ball 49 of the intermediate base 43, and the distance between the ball 49 disposed on the frontmost end side of the rear base 44 and the ball 49 of the intermediate base 43 are L1. Then, assuming that the distance in the front-rear direction between the rear end (end of the pull-out direction) of the protrusion 22 of the tester 2 and the center of gravity P is L2, the following relationship is satisfied: the distance L2≤the distance L1.

Assuming that the distance L2<the distance L1, when looking at the movement of the protrusion 22 on the two balls 49 forming the distance L1 when the tester 2 is pulled out, the center of gravity P of the tester 2 is positioned on the rear side beyond the ball 49 of the front side before the rear end of the protrusion 22 reaches the ball 49 of the rear side. In that case, the tester 2 is inclined such that the rear end of the tester 2 is lowered between two balls 49. That is, by setting the distance L2≤the distance L1, the balls 49 are arranged such that the rear end side of the protrusion 22 is supported by the balls 49 when the center of gravity P is positioned between the balls 49 in the front-rear direction. Thus, the tester 2 may be pulled out stably with a small amount of force. When the support base 4 is in the contracted state, the distance L1 is smaller than the distance L1 in the expanded state, thereby satisfying the distance L2≤the distance L1 in the case of being in the contracted state. Thus, the tester 2 may be stably pulled out.

In this manner, the trolley 3 is configured such that the lateral width is changeable by expanding and contracting the support base 4 according to the pull-out amount of the tester 2 required for the maintenance. Therefore, the tester 2 may be supported even when the pull-out amount is large. In addition, when the pull-out amount is small, the lateral width of the trolley 3 may be suppressed to be small, thereby securing a relatively large space at the rear side of the trolley 3. Therefore, when the tester 2 is supported by the trolley 3, the obstruction of the passage of people by the trolley 3 is suppressed.

Further, since the support bases 4 in each of the tiers are connected to each other via the column 32, which is a connection member, the support bases 4 in each of the tiers may be collectively expanded and contracted by moving the column 32 as described above. Therefore, after the trolley 3 is disposed on the rear side of the cell tower 12 for the maintenance of the part 23, it is possible to quickly change the length of the trolley 3, and to pull out the tester 2. Further, since the support bases 4 in each of the tiers are collectively expanded and contracted in this manner, after the tester 2 is returned to the cell 13, the length of the trolley 3 may be quickly changed and be retracted from the rear side of the cell tower 12 to another place. Since the support bases 4 on the left and the right are connected to each other via the beam 33 and the column 32, and collectively expanded and contracted, the length of the trolley 3 may be changed more quickly. Then, the casters 34 that roll on the floor are provided at the lower end of the column 32, the operator may change the length of the trolley 3 by expanding and contracting the support base 4 with a relatively small force.

(Second Embodiment)

A trolley 3A according to a second embodiment will be described focusing on the difference from the trolley 3, with reference to FIGS. 11 and 12, which are top views, and FIGS. 13 and 14, which are schematic side views. Front, rear, left, and right used in the following description of each trolley after the second embodiment are also assumed to be the front, rear, left, and right when the trolley is disposed on the rear side of the cell 13 to support the tester 2.

The trolley 3A includes a support base 4A instead of the support base 4. The support base 4A is also expanded and contracted similarly to the support base 4, and accordingly, the length of the trolley 3A is changed. However, the intermediate base 43 is not provided in the support base 4A, and thus, during the expanding and the contracting, the relative positions of the front base 42 and the rear base 44 are changed. That is, the support base 4 of the above-described trolley 3 is configured to be expanded and contracted in two steps, but the support base 4A of the trolley 3A is expanded and the contracted in one step, and two sliding portions 45 are provided in one support base 4A.

The rear end of the base 41 of the support base 4A is fixed to the rear base 44. Then, the front side of the base 41 is advanced into the recess 51 provided in the front base 42 similarly to the base 41 of the support base 4, and the left and right side walls of the recess 51 and the left-right side surfaces of the front side of the baser 41 are connected by the sliding portion 45. With such a configuration, as described above, it is possible to change the length of the support base 4A by changing the relative positions of the front base 42 and the rear base 44, and the front base 42 and the rear base 44 are in contact with each other in the contracted state of the support base 4A.

As described above, the support base 4A is expanded and contracted in one step. Therefore, as illustrated in FIGS. 13 and 14, only one pin 56 for fixing the length of the support base 4A is provided in one support base 4A, and the through hole 53 into which the pin 56 is inserted is opened as the recess 51 of the front base 42. Further, one recess 54 into which the pin 56 is inserted to fix the support base 4A in the contracted state, and one recess 55 into which the pin 56 is inserted to fix the support base 4A in the expanded state are provided on both the rear side and front side of the base 41.

Since the intermediate base 43 is not provided in the support base 4A, during the expanded state of the support base 4A, the maximum value L1 of the distance between the adjacent balls 49 in the above-described front-rear direction is relatively large. Specifically, the distance between the ball 49 on the frontmost end of the rear base 44 and the ball 49 on the rearmost end of the front base 42 becomes relatively long, but each ball is disposed so as to satisfy the relationship in which the distance L2≤the distance L1 as described above. The balls 49 are provided so as to satisfy the relationship in each of the following embodiments.

The trolley 3A is used in the same procedure as for the trolley 3, and supports the tester 2. Similarly to the trolley 3, the trolley 3A may also have a short lateral width except a case where it is necessary to increase the pull-out amount of the tester 2, and thus, it is possible to obtain the same effect as that of the trolley 3. Further, since the number of components of the trolley 3A is relatively small, it is advantageous from the viewpoint of suppressing the manufacturing cost.

(Third Embodiment)

A trolley 6 according to a third embodiment will be described focusing on the difference from the trolley 3, with reference to FIG. 15, which is a schematic perspective view, FIGS. 16 and 17, which are top views, and FIGS. 18 and 19, which are schematic side views illustrating a support base 4B and an extending base 61 that constitute the trolley 6. First, a schematic configuration of the trolley 6 will be described. The trolley 6 includes a support base 4B configured substantially the same as the support base 4 in the contracted state of the trolley 3, and the support base 4B is provided in three tiers in the vertical direction and on the left and the right in the trolley 6, similarly to the support base 4.

However, the support base 4B is not expanded and contracted. Instead, in the trolley 6, the horizontal extending base 61 is provided on the rear side of each support base 4B at the same height as the support base 4B. Therefore, the extending base 61 is also provided in three tiers and on the left and the right, similarly to the support base 4B. Then, the extending bases 61 arranged on the left and the right are paired and used to support the left and the right on the rear side of the tester 2. In the third embodiment, the support base 4B is a first support, and the extending base 61 is a second support.

Then, the extending base 61 may rotate around the vertical axis and change the direction thereof, and the lateral width of the trolley 6 is changed by the direction change (position change). When the lateral width of the trolley 6 is the first length, which is relatively short, only the support base 4B is used among the support base 4B and the extending base 61 to support the tester 2 in a case of the first length, and only a part of the tester 2 is supported by the trolley 6 for the maintenance of the part 24 as in the case where the trolley 3 is used. In addition, when the lateral width of the trolley 6 is the second length, which is larger than the first length, the support base 4B and the extending base 61 are used to support the tester 2, and the entire tester 2 is supported by the trolley 6 for the maintenance of the part 23 as in the case where the trolley 3 is used. FIGS. 16 and 18 illustrate a state where the extending base 61 is at the first position and the trolley 6 has the first length, and FIGS. 15, 17, and 19 illustrate a state where the extending base 61 is at the second position, and the lateral width of the trolley 6 has the second length.

Hereinafter, each part of the trolley 6 will be described in detail, but in the following description, the center side of the trolley in the left-right direction is described as the center side in the left-right direction, and the opposite side is described as the outer side in the left-right direction. The difference between the support base 4B and the support base 4 may be that the stopper 58 positioned at the rear side of the row of balls 49 arranged in the front-rear direction may be freely attached/detached. When the length of the trolley 6 is changed as described later, this is for making the front-rear position of the pull-out tester 2 to be appropriate in each state of the first length and the second length, by replacing the stopper 58 between the position of the support base 4B and the extending base 61.

Each column 32 does not penetrate the support base 4B, and supports the support base 4B from the rear side so as not to hinder the rotation of the extending base 61. Then, a column 62 extending in the vertical direction is provided on the rear side of each column 32, and the rear side side surface of the column 32 and the front side side surface of the column 62 are connected with each other via a hinge 63. Then, a shaft 64 that constitutes the hinge 63 is along the longitudinal direction, more specifically, the vertical direction. Therefore, the column 62 may be freely rotated around the shaft 64, and the column 62 may be moved between one position (position in FIG. 17) arranged in the front-rear direction with respect to the column 32 and the other position (position in FIG. 16) shifted from the one position to the center side of the trolley 6 in the left-right direction. Hereinafter, for convenience of explanation, unless otherwise specified, the column 62 will be described as being positioned at the one position. This one position is a position where the lateral width of the trolley 6 has the second length, the extending base 61 is at the second position, and the hinge 63 is closed. Then, the position of the shaft 64 in the left-right direction is aligned with the position of the side surfaces of the columns 32 and 62 on the center side in the left-right direction.

Then, a column 65 extending in the vertical direction is provided at a position separated rearward from the column 62, and the columns 62 and 65 are connected to each other by the extending base 61 and a beam 66 extending in the front-rear direction (see FIG. 15). Then, the beam 66 connects the lower end of the column 62 and the lower end of the column 65, and a caster 67 is provided below the column 65.

Subsequently, the extending base 61 will be described. The extending bases 61 provided on the left and the right are formed substantially mirror-symmetrically with respect to the center of the trolley 6 in the left-right direction. As illustrated in FIG. 17, the extending base 61 is configured as a rectangular plate shape in which the longer sides are along the front-rear direction in plan view, and the front end and the rear end thereof are fixed to the columns 62 and 65, respectively. Therefore, the extending base 61 at the second position extends from the shaft 64, which is a rotation axis, toward the side opposite to the support base 4B, which is the first support, via the column 62. Further, the extending base 61 is provided to protrude from the columns 62 and 65 to the center side in the left-right direction, and the positions on the left and the right of the edge of the extending base 61 on the center side in the left-right direction and the edge of the support base 4B arranged forward of the extending base 61 on the center side in the left-right direction are aligned with each other.

As described above, the position regulating portion 57, which is the same as that provided on the support base 4B, is provided to extend in the front-rear direction on the upper surface of the portion of the extending base 61 protruding from the columns 62 and 65, and the left and right positions of the position regulating portion 57 are the same as the left and right positions of the position regulating portion 57 of the support base 4B arranged forward of the extending base 61. Further, a plurality of balls 49 is provided to be aligned in the front-rear direction on the upper surface of the extending base 61 on the center side in the left-right direction from the position at which the position regulating portion 57 is provided. The left and right positions of the balls 49 are the same as the left and right positions of the balls 49 on the support base 4B arranged forward of the extending base 61. Then, the stopper 58 may be freely attached/detached at the position at the rear side of each ball 49 on the extending base 61.

Further, a connection member 71 is provided on the outer side in the left-right direction of the central portion of each of the column 32 and the column 62 in the longitudinal direction (see FIG. 15). The connection members 71 are formed to extend from the side portion of the column 32 and the side portion of the column 62 to the rear side and the front side, respectively. As illustrated in FIG. 17, through holes 72 are drilled in the connection members 71 in the vertical direction, and the through holes 72 overlap with each other, and the pins 56 are inserted into the through holes 72. Therefore, the columns 32 and 62 are fixed with each other, and the front-rear length of the trolley 6 is fixed to the second length. By detaching the pins 56 from the connection members 71, the column 62 may be rotated, and the length of the trolley 6 may be changed.

Further, a connection member 73 extending from the side portion of the column 65 toward the rear side is provided on the outer side in the left-right direction of the central portion of each column 65 in the longitudinal direction, and through holes 74 are provided in the connection member 73 in the vertical direction. When the front-rear length of the trolley 6 has the first length, which is relatively short, each column 65 is rotated to be biased to the center of the trolley 6 in the left-right direction so as to be arranged on the left and the right. The position of the extending base 61 in this state is the first position. In the first position, in plan view, the longer side of the extending base 61 is aligned in the left-right direction, and the shorter side is aligned in the front-rear direction. Therefore, the extending base 61 is in the expanded state from the shaft 64, which is the rotation axis toward the center side of the trolley 6 in the left-right direction via the column 62 (see FIG. 16).

In this manner, the extending base 61 is rotated to change the direction by 90° when the trolley 6 has the first length and when the trolley 6 has the second length. Then, as described above, in a state where the trolley 6 has the first length and the column 65 is arranged in the left-right direction, the through holes 74 in the connection members 73 are overlapped vertically. By inserting the pins 56 into these through holes, each of the columns 65 are fixed with each other, and the trolley 6 is fixed to the first length.

Subsequently, in maintaining the front side part 23 of the tester 2, a procedure for supporting the tester 2 on the trolley 6 will be described focusing on the difference from the procedure for supporting the tester 2 on the trolley 3. First, it is assumed that the trolley 6 is fixed to the first length illustrated in FIG. 16, and the stopper 58 is provided in the support base 4B. An operator moves the trolley 6 to the rear side of the cell 13, and then, fixes the wheel of the caster 34 by the stopper 35 of the caster 34 below the column 31 in the same manner as the operation with the trolley 3. Subsequently, the operator detaches the pins 56 inserted into the connection member 73, rotates the columns 65 to be separated from each other and changes the direction of the extending base 61 as illustrated by arrows in FIG. 16, and sets the lateral width of the trolley 6 to the second length by aligning the longitudinal direction of the extending base 61 in the front-rear direction.

Then, the operator inserts the detached pins 56 into each of the connection members 71 that is overlapped with each other by rotating the column 65, and fixes the direction of the extending base 61, and then, detaches the stopper 58 from the support base 4B and attaches again to the extending base 61. After that, the operator pulls out the tester 2 from the cell 13 to the rear side such that the protrusion 22 is put on each ball 49 of the support base 4B and the extending base 61. After pulling out until the protrusion 22 abuts on the stopper 58, the operator fixes the tester 2 to the trolley 6 by the lock mechanism 36. FIGS. 17 and 19 illustrate the tester 2 and the protrusion 22 of the tester 2 in a state where the pull-out is completed in this manner, respectively.

When the rear side part 24 of the tester 2 is maintained, the procedure is the same as the case of serving the part 23, except that the pin 56 is not attached/detached, the column 65 is not rotated, and the stopper 58 is not attached again, and the tester 2 is pulled out while the trolley 6 has the first length. FIGS. 16 and 18 illustrate the tester 2 and the protrusion 22 of the tester 2 in a state where the pull-out is completed in this manner while the trolley 6 has the first length, respectively. When the pulled-out tester 2 is returned to the cell 13, an operation along with the reverse procedure of the pulling out is performed in both cases when the trolley 6 is pulled out by the first length, and when the trolley 6 is pulled out by the second length.

Similarly to the trolleys 3 and 3A, the trolley 6 may have a small front-rear width except the case where the tester 2 is supported to maintain the part 23. In addition, it is possible to secure a sufficient space at the rear side of the trolley 6 in the state where the front-rear width is small in this manner. Further, since the trolley 6 does not include the sliding portion 45, and the configuration is simple, it is desirable that the manufacturing cost may be further suppressed. However, when the trolley 6 has the first length, the extending base 61 does not support the tester 2. As a result, from the viewpoint of reducing the lateral width of the trolley having the first length, it is desirable to configure such that the rear base 44 slides as in the trolleys 3 and 3A, and the tester 2 is also supported by the rear base 44 when the trolley 6 has the first length. In the trolley 6, the column 32 and the extending base 61 are connected via the column 62, but it may be configured such that the hinge 63 is disposed at the same height as the extending base 61, and the extending base 61 and the column 32 are directly connected by the hinge 63 without being provided with the column 62. When the column 62 is not provided in this manner, the caster 67 provided in the beam 66 that connects the column 62 and the column 65 to each other may be provided, for example, in the lower end of the column 65.

(Fourth Embodiment)

A trolley 6A according to a fourth embodiment will be described focusing on the difference from the trolley 6, with reference to FIGS. 20 and 21, which are top views, and FIGS. 22 and 23, which are schematic side views illustrating a support base 4C and the extending base 61 that constitute the trolley 6A. With respect to the trolley 6A, similarly to the trolley 6, the lateral width of the trolley 6A is changed between the first length and the second length by the rotation of the extending base 61. FIGS. 20 and 22 illustrate a state of the first length, and FIGS. 21 and 23 illustrate a state of the second length. However, as will be described in detail later, the trolley 6A is different from the trolley 6 in the path in which the extending base 61 is rotated when the length of the trolley 6A is changed in this manner.

First, descriptions will be made on a state where the trolley 6A has the second length, that is, a state where the extending base 61 is positioned at the second position. As illustrated in FIG. 21, the trolley 6A includes the support base 4C instead of the support base 4B. The support base 4C has a configuration which is substantially the same as the support base 4B of the trolley 6, but the difference from the support base 4B is that the rear portion on the outer side in the left-right direction is notched. When this notch is indicated by 76, the notch 76 has a rectangular shape in plan view, and is formed elongated in the front-rear direction. Therefore, by forming the notch 76, the support base 4C is formed so that the center side in the left-right direction protrudes to the rear side, and a protrusion is indicated by 77. The column 32 is disposed so as to support the support base 4C by penetrating the outer side in the left-right direction at the rear end of the protrusion 77.

The extending base 61 provided in the trolley 6A is formed to have a relatively small width in the left-right direction, and is disposed to extend rearward from the protrusion 77 described above. The trolley 6A is not provided with the column 62, and the front end surface of the extending base 61 and the side surface of the rear side of the column 32 are connected with each other by the hinge 63. When the trolley 6A has the second length, the hinge 63 is in the closed state, and the position of the shaft 64 of the hinge 63 in the left-right direction is aligned with the side surface of each of the column 32 and the extending base 61 on the outer side in the left-right direction. Similarly to the trolley 6, the rear end of the extending base 61 is penetrated by the column 65, and is supported by the column 65.

With the configuration as described above, the extending base 61 may be rotated using the shaft 64 as a rotation axis so as to pass through the position outside in the left-right direction with respect to the protrusion 77. Subsequently, the state where the trolley 6A has the first length, that is, the state where the extending base 61 is positioned at the first position will be described. The direction of the extending base 61 when the trolley 6A has the first length is different from the direction of the extending base 61 when the trolley 6A has the second length by 180°, and as illustrated in FIG. 20, the extending base 61 is positioned at a position where it fits into the notch 76 together with the column 65 in plan view. That is, the extending base 61 protrudes from the shaft 64, which is a rotation axis, toward the side at which the support base 4C (first support) is positioned in the front-rear direction. The extending base 61 and the column 65 that are fitted into the notch 76, and the support base 4C form a rectangular shape in plan view.

The connection members 71 and 73 into which the pins 56 are inserted to fix the trolley to the first length or the second length mentioned in the description of the trolley 6 may be provided at arbitrary positions so that the extending base 61 is fixed with respect to the support base 4C in each state as described above. The trolley 6A is used and operated using the same procedure as that of the trolley 6. At this time, since the lateral width may be changed, similarly to each trolley as described above, it is possible to prevent the space at the rear side from being constantly narrowed when the tester 2 is supported.

Further, when the trolley 6A has the first length, the extending base 61 fits into the notch 76 of the support base 4C as described above, and thus, the support base 4C and the extending base 61 are arranged in the left and right direction. By arranging each base on the left and the right in this manner, the lateral width of the trolley 6A is able to be further suppressed when the trolley 6A the first length. However, with such a configuration, when the lateral width is changed in the trolley 6A, the extending base 61 is moved outside in the left-right direction of the support base 4C. Thus, a relatively large space is required on the left and the right of the trolley 6A. Therefore, from the viewpoint of reducing the required space on the left and the right of the trolley, it is desirable that the area required for the rotation of the extending base 61 is limited to the rear of the support base 4B as in the trolley 6.

In each embodiment as described above, the rolling body configured to support the protrusion 22 of the tester 2 is configured as the ball 49, but it may be desirable as long as the protrusion 22 can be moved by rolling, and the rolling body may be, for example, a roller. With respect to the support base 4 and the extending base 61, when the friction with the protrusion 22 is relatively low, the tester 2 may be moved, and thus, the rolling body may not be provided.

Further, in each embodiment as described above, the support base 4 are provided in three tiers so as to pull out and support the tester 2 from each of the cells 13 stacked in three tiers, but the number of tiers of the support base 4 is not limited to three, and may be appropriately set according to the number of stacked cells 13. Then, the number of tiers of the support base 4 is not limited to a plurality of stages, and the trolley may be configured to have one tier.

Further, components of the substrate processing apparatus supported by the trolley may include any as long as they can be laterally moved from the apparatus and supported. Therefore, the application of the trolley is not limited to the wafer inspecting apparatus 1, but may be applied to a substrate processing apparatus including a component that is moved in the lateral direction to adjust the pull-out amount to the outside. Further, the position where the component is supported may be appropriately changed according to the shape or the configuration of the component, and for example, the trolley may support the central portion of the component in the left-right direction. That is, the present disclosure is not limited to the configuration of the trolley in which the supports are provided to be paired on the left and the right.

According to the present disclosure, when the component of the apparatus is pulled out from the substrate processing apparatus and is supported by the trolley, it is possible to reduce the space occupied by the trolley except when necessary.

From the foregoing, it will be appreciated that various embodiments of the present disclosure have been described herein for purposes of illustration, and that various Modifications may be made without departing from the scope and spirit of the present disclosure. Accordingly, the various embodiments disclosed herein are not intended to be limiting, with the true scope and spirit being indicated by the following claims.

What is claimed is:

1. A trolley comprising:
a trolley body including a wheel that is freely movable on a floor, and a pair of first supports, the pair of first supports being 1) spaced apart from each other in a left-right direction by a distance configured to receive a body of a component of a substrate processing apparatus therebetween, and 2) configured to slidably receive protrusions extending from the body of the component in a lateral direction such that the component is pulled out to an outside of the substrate processing apparatus; and
a pair of second supports connected to the trolley body so as to be freely movable between a first position where a width of the trolley in the lateral direction is a first length, and a second position where the width in the lateral direction is a second length longer than the first length, and the pair of first and second supports are configured to support the component at the second position together.

2. The trolley according to claim 1, wherein, when the lateral direction in which the component is pulled out is set to be a rear side, one of the pair of first supports and one of the pair of second supports forming a first set and the other of the pair of first supports and the other of the pair of second supports forming a second set, the first and second sets being configured to support a left side and a right side of the component via the protrusions, respectively.

3. The trolley according to claim 2, wherein the first support and the second support in each set are provided to be aligned in a front-rear direction and a relative position in the front-rear direction is changeable.

4. The trolley according to claim 3, further comprising:
a sliding body including a first slider and a second slider that are slidable with each other,
wherein the first slider and the second slider are provided in the first support and the second support of each set, respectively.

5. The trolley according to claim 4, wherein the second support of each set includes an intermediate support provided on a side of the first support in the front-rear direction, and an end side support provided on an opposite side of the first support with respect to the intermediate support,
a plurality of sliding bodies is provided,
the first slider and the second slider of the sliding body are provided in the first support and the intermediate support of each set, respectively, and a relative position of the first support and the intermediate support of each set is changeable in the front-rear direction via the first slider and the second slider, and
a third slider and a fourth slider are provided in the end side support and the intermediate support of each set, respectively, and a relative position of the end side support and the intermediate support of each set is changeable in the front-rear direction via the third slider and the fourth slider.

6. The trolley according to claim 2, further comprising:
a base configured to change a relative position in the front-rear direction with respect to the first support of each set,
wherein the second support of each set is provided on the base to be movable in the left-right direction,
at the first position, the second support is arranged in the left-right direction with respect to the first support, and
at the second position, the second support is arranged in the front-rear direction with respect to the first support.

7. The trolley according to claim 2, wherein the second support in each set is freely rotatable around a rotation axis, and
at the second position, the second support extends to a side opposite to the first support with respect to the rotation axis.

8. The trolley according to claim 7, wherein the rotation axis is an axis extending along a vertical direction.

9. The trolley according to claim 1, wherein the pair of first supports and the pair of second supports are provided in a plurality of tiers in the vertical direction.

10. The trolley according to claim 9, wherein a plurality of second supports in each tier is connected to each other via a connector such that a position is collectively changed between the first position and the second position.

11. The trolley according to claim 10, wherein the connector is provided with a wheel in order to roll and move on the floor.

12. The trolley according to claim 1, further comprising:
a roller provided on each of the first supports and the second supports and configured to support a supported portion of the component from below and roll as the supported portion moves.

13. The trolley according to claim 12, wherein a plurality of rollers is provided at intervals in the front-rear direction, and
in each of a first state where the pair of second supports are positioned at the first position and a second state where the pair of second supports are positioned at the second position, a maximum distance between the plurality of rollers adjacent in the front-rear direction is equal to or less than a distance between a rear end of the supported portion and a center of gravity of the component in the front-rear direction.

14. A method for supporting a component of a substrate processing apparatus, the method comprising:
moving a trolley constituted by a trolley body including a wheel on a floor;
in a state where a pair of second supports connected to the trolley body is positioned at a first position and a width of the trolley in the lateral direction is a first length, slidably supporting protrusions extending from a body of the component of the substrate processing apparatus pulled out to an outside of the substrate processing apparatus in a lateral direction by a first pull-out amount from the substrate processing apparatus, by a pair of first supports provided in the trolley body being spaced apart from each other in a left-right direction by a distance configured to receive a body of the component therebetween;
positioning the pair of second supports at a second position, and setting the width of the trolley in the lateral direction to a second length longer than the first length; and
in a state where the width of the trolley in the lateral direction is set to the second length, supporting the component of the substrate processing apparatus pulled out to the outside of the substrate processing apparatus in the lateral direction by a second pull-out amount larger than the first pull-out amount from the substrate processing apparatus, by the pair of first supports and the pair of second supports.

15. A trolley comprising:
a trolley body including a wheel that is freely movable on a floor, and a first support configured to support a component of a substrate processing apparatus that slides in a lateral direction and is pulled out to an outside of the substrate processing apparatus; and
a second support connected to the trolley body so as to be freely movable between a first position where a width of the trolley in the lateral direction is a first length and a second position where the width in the lateral direction is a second length longer than the first length, and configured to support the component at the second position together with the first support,
wherein when the second support is in the first position, the component is pulled out in the lateral direction from the substrate processing apparatus by a first pull-out amount and is supported by the first support, and
when the second support is in the second position, the component is pulled out in the lateral direction from the substrate processing apparatus by a second pull-out amount larger than the first pull-out amount and is supported by the first support together with the second support.

* * * * *